US009374677B2

(12) United States Patent
Tarlazzi et al.

(10) Patent No.: US 9,374,677 B2
(45) Date of Patent: Jun. 21, 2016

(54) SYSTEM AND METHOD FOR LOCATION OF MOBILE DEVICES IN CONFINED ENVIRONMENTS

(71) Applicant: CommScope Technologies LLC, Hickory, NC (US)

(72) Inventors: Luigi Tarlazzi, Dallas, TX (US); Keld Lange, Oetisheim (DE); Thomas Kummetz, Kissing (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/593,470

(22) Filed: Jan. 9, 2015

(65) Prior Publication Data
US 2015/0119079 A1 Apr. 30, 2015

Related U.S. Application Data

(63) Continuation-in-part of application No. 14/165,000, filed on Jan. 27, 2014, now Pat. No. 9,000,911, which is a continuation of application No. 13/846,352, filed on Mar. 18, 2013, now Pat. No. 8,638,214, which is a continuation of application No. 12/714,602, filed on Mar. 1, 2010, now Pat. No. 8,400,292.

(51) Int. Cl.
*G08B 23/00* (2006.01)
*H04W 4/04* (2009.01)
(Continued)

(52) U.S. Cl.
CPC .. *H04W 4/04* (2013.01); *G01S 5/06* (2013.01); *H04W 24/00* (2013.01); *G01S 5/0289* (2013.01); *G01S 19/48* (2013.01)

(58) Field of Classification Search
CPC ......... H04W 64/00; H04W 4/04; H04W 4/02; H04W 67/22
USPC .................. 340/517, 539.13, 539.11, 539.23, 340/573.3; 455/456.1
See application file for complete search history.

(56) References Cited

U.S. PATENT DOCUMENTS 6,184,829 B1  2/2001  Stilp
6,249,252 B1  6/2001  Dupray
(Continued)

FOREIGN PATENT DOCUMENTS

EP   2317813      5/2011
JP   2008042861   2/2008
(Continued)

OTHER PUBLICATIONS

Twenty-Page International Search Report mailed Jul. 9, 2011 for PCT/US2011/026050.
(Continued)

*Primary Examiner* — Phung Nguyen
(74) *Attorney, Agent, or Firm* — Fogg & Powers LLC

(57) ABSTRACT

A distributed antenna system comprising a master unit configured for interfacing with at least one signal source, a plurality of remote units coupled with the master unit and configured for interfacing with a user device, a remote unit including filtering circuitry for decomposing uplink signals from a user device into a plurality of narrowband signals and processing circuitry for evaluating the plurality of uplink narrowband signals and providing data for a power profile that is associated with the uplink signals of a specific user device, and location measurement circuitry coupled with the remote units and configured to receive data for a plurality of different power profiles from a plurality of different remote units wherein the plurality of power profiles are associated with the same specific user device, the location measurement unit configured for processing the power profile data from the different remote units to determine the location of the specific user device with respect to the distributed antenna system.

20 Claims, 13 Drawing Sheets

(51) Int. Cl.
    *G01S 5/06*     (2006.01)
    *H04W 24/00*     (2009.01)
    *G01S 19/48*     (2010.01)
    *G01S 5/02*     (2010.01)

(56) References Cited

U.S. PATENT DOCUMENTS

| | | | |
|---|---|---|---|
| 6,674,403 | B2 | 1/2004 | Gray et al. |
| 6,873,852 | B2 | 3/2005 | Koorapaty et al. |
| 6,952,181 | B2 | 10/2005 | Karr et al. |
| 6,961,367 | B2 | 11/2005 | Simic et al. |
| 6,996,392 | B2 | 2/2006 | Anderson et al. |
| 7,194,275 | B2 | 3/2007 | Bolin et al. |
| 7,245,925 | B2 | 7/2007 | Zellner |
| 7,257,387 | B2 | 8/2007 | Laliberte |
| 7,298,327 | B2 | 11/2007 | Dupray et al. |
| 7,321,777 | B2 | 1/2008 | Billhartz et al. |
| 7,327,258 | B2 | 2/2008 | Fast et al. |
| 7,427,952 | B2 | 9/2008 | Bull et al. |
| 7,429,936 | B2 | 9/2008 | Paradiso et al. |
| 7,440,762 | B2 | 10/2008 | Maloney et al. |
| 7,525,425 | B2 | 4/2009 | Diem |
| 7,525,484 | B2 | 4/2009 | Dupray et al. |
| 7,528,723 | B2 | 5/2009 | Fast et al. |
| 7,529,236 | B2 | 5/2009 | Kota et al. |
| 7,539,161 | B2 | 5/2009 | Bolin et al. |
| 7,546,084 | B2 | 6/2009 | Kennedy, Jr. et al. |
| 7,570,615 | B2 | 8/2009 | Bolin et al. |
| 7,616,155 | B2 | 11/2009 | Bull et al. |
| 7,665,263 | B2 | 2/2010 | Yau |
| 7,732,088 | B2 | 6/2010 | Somerville et al. |
| 7,738,836 | B2 | 6/2010 | Alles et al. |
| 7,837,774 | B2 | 11/2010 | Breindel et al. |
| 7,848,733 | B2 | 12/2010 | Bull et al. |
| 7,852,262 | B2 | 12/2010 | Namineni et al. |
| 7,903,029 | B2 | 3/2011 | Dupray |
| 7,920,875 | B2 | 4/2011 | Anderson |
| 7,925,205 | B2 | 4/2011 | Kennedy, Jr. et al. |
| 7,925,274 | B2 | 4/2011 | Anderson et al. |
| 8,010,079 | B2 | 8/2011 | Mia et al. |
| 8,032,153 | B2 | 10/2011 | Dupray et al. |
| 8,045,917 | B2 | 10/2011 | Beck et al. |
| 8,103,285 | B2 | 1/2012 | Kalhan |
| 8,121,646 | B2 | 2/2012 | Oren et al. |
| 8,144,640 | B2 | 3/2012 | Bims |
| 8,203,910 | B2 | 6/2012 | Zhao et al. |
| 8,238,942 | B2 | 8/2012 | Gast |
| 8,260,323 | B1 | 9/2012 | Bronner et al. |
| 8,285,245 | B2 | 10/2012 | Ashley, Jr. et al. |
| 8,400,292 | B2 | 3/2013 | Kummetz |
| 8,638,214 | B2 | 1/2014 | Kummetz |
| 8,873,585 | B2 | 10/2014 | Oren et al. |
| 9,000,911 | B2 | 4/2015 | Kummetz |
| 2003/0117281 | A1 | 6/2003 | Sriharto et al. |
| 2004/0100930 | A1 | 5/2004 | Shapira et al. |
| 2006/0014548 | A1* | 1/2006 | Bolin et al. .............. 455/456.1 |
| 2006/0281913 | A1 | 12/2006 | Ferreira et al. |
| 2007/0159388 | A1 | 7/2007 | Allison et al. |
| 2007/0229350 | A1 | 10/2007 | Scalisi et al. |
| 2008/0085439 | A1 | 4/2008 | Hilliard |
| 2008/0085440 | A1 | 4/2008 | Yasumoto et al. |
| 2008/0167049 | A1* | 7/2008 | Karr et al. .............. 455/456.2 |
| 2008/0175175 | A1 | 7/2008 | Oren et al. |
| 2008/0186955 | A1 | 8/2008 | Puckett |
| 2008/0191941 | A1* | 8/2008 | Saban et al. .............. 342/450 |
| 2008/0198955 | A1 | 8/2008 | Oren et al. |
| 2008/0200117 | A1 | 8/2008 | Oren et al. |
| 2008/0248811 | A1* | 10/2008 | Maloney et al. .......... 455/456.1 |
| 2008/0284647 | A1 | 11/2008 | Oren et al. |
| 2009/0021345 | A1 | 1/2009 | Sriharto et al. |
| 2009/0045939 | A1* | 2/2009 | Holland et al. ............. 340/524 |
| 2009/0073043 | A1 | 3/2009 | Nozaki |
| 2009/0295639 | A1 | 12/2009 | Zhao et al. |
| 2011/0210843 | A1 | 9/2011 | Kummetz |

FOREIGN PATENT DOCUMENTS

| | | |
|---|---|---|
| WO | 2008063443 A2 | 5/2008 |
| WO | 2008085439 A1 | 7/2008 |
| WO | 2008085440 A2 | 7/2008 |
| WO | 2008085443 A2 | 7/2008 |
| WO | 2008085444 A1 | 7/2008 |
| WO | 2008099390 A2 | 8/2008 |
| WO | 2009081376 A2 | 7/2009 |
| WO | 2011109218 A1 | 9/2011 |

OTHER PUBLICATIONS

Six-page Partial International Search Report mailed Jun 8, 2011 for PCT/US2011/026050.

International Search Authority, "International Search Report and Written Opinion for PCT Application No. PCT/US2016/012664", "from Foreign Counterpart to U.S. Appl. No. 14/593,470", Apr. 20, 2016, pp. 1-13, Published in: WO.

* cited by examiner

SYSTEM AND METHOD FOR LOCATION OF MOBILE DEVICES IN CONFINED ENVIRONMENTS

RELATED APPLICATIONS

This Application is a Continuation-in-Part Application of U.S. patent application Ser. No. 14/165,000, filed Jan. 27, 2014, now U.S. Pat. No. 9,000,911, entitled "SYSTEM AND METHOD FOR LOCATION OF MOBILE DEVICES IN CONFINED ENVIRONMENTS", which is a continuation application of U.S. patent application Ser. No. 13/846,352, filed Mar. 18, 2013, entitled "SYSTEM AND METHOD FOR LOCATION OF MOBILE DEVICES IN CONFINED ENVIRONMENTS", now issued U.S. Pat. No. 8,638,214, issued Jan. 28, 2014, which is a continuation application of U.S. patent application Ser. No. 12/714,602, filed Mar. 1, 2010, entitled "SYSTEM AND METHOD FOR LOCATION OF MOBILE DEVICES IN CONFINED ENVIRONMENTS", now issued U.S. Pat. No. 8,400,292, issued Mar. 19, 2013. The applications, patents, and disclosure are all hereby incorporated by reference in their entireties as though fully disclosed herein.

BACKGROUND OF THE INVENTION

The use of wireless communication devices, such as wireless telephones and other devices, has become particular prevalent in today's society. In some instances individuals often forego traditional wired phone service, and rely totally on their wireless mobile devices for communication.

Determining the location of a wireless device, and the location of a specific user, has also become very important in the overall communication scheme. Utilizing smart phone devices, users have access to wide variety of location-based services. Such services can provide navigation, advertising, location features, and other features associated with the specific location of a user, as determined through their mobile device. Often, such features are provided through the use of the Global Positioning Service (GPS) technology of the device. The GPS functionality provides the location of a device and its user. However, such features may also be provided by the interface of the mobile device with multiple base transceiver stations (BTS) if a GPS functionality is not available.

Such location services are particularly important, when they are related to emergency 911 services in the United States and Canada, or 112 services in the European Union. Such services need to be implemented when the users or mobile devices are not in the coverage area of a GPS signal, or the GPS functionality is not available. In such cases, mobile device communications with one or more BTS's is relied upon.

However, if a person is inside of a building, or in an enclosed area, such as a tunnel, stadium, shadowed area of a mountain, underground train, train coach, ship, or other structure, where direct signal access to the necessary BTS's is not available, wireless communications often have to be facilitated through signal repeating systems, such as distributed antenna systems (DAS). Distributed antenna systems generally utilize one or more master units that interface with one or more signal sources, such as base transceiver stations (BTS's) signal sources, such as base transceiver stations. Each master unit is then coupled, through a signal transport and distribution network, to a plurality of remote antenna units that are located in various physical locations around a building, tunnel, train, ship, or other structure that the mobile device users may inhabit. The mobile device is interfaced with the distributed antenna system through the various remote units, and ultimately communicates to a necessary BTS. With the increasing use of mobile devices, more emergency cells are initiated from mobile devices and location of users in extended coverage areas becomes more important. However, for the purposes of mobile device and user location, such distributed antenna systems often are not equipped to provide such location information to a BTS, because the BTS has no visibility with respect to the user's distribution or location within the coverage area that is served by one or more remote units of a distributed antenna system. Accordingly, existing solutions used in indoor or sheltered environments are insufficient to provide the needed location information data for extended coverage areas.

Furthermore, with existing distributed antenna systems not providing an indication of the location for various users within the coverage area, the BTS does not know how to optimally allocate the resources, including signal time and frequency resources, for specific remote units within the larger overall mesh of remote units that make up a distributed antenna system within a building or other space. Systems for addressing the needs in the prior art are provided by U.S. Pat. Nos. 8,400,292 and 8,638,214, which are parent patents to this current Application.

Accordingly, it is desirable to further provide the position of a user within a distributed antenna system coverage area that is provided at the level of the remote units in order to provide an accurate indication of the location the user, as well as to provide the overall system with information for being able to optimally allocate the resources of the system.

SUMMARY OF THE INVENTION

A distributed antenna system of the invention includes at least one master unit configured for interfacing with at least one signal source, such as a BTS. A plurality of remote units are coupled with the master unit and configured for interfacing with a user device. The remote units include filtering circuitry for decomposing uplink signals from a user device into a plurality of narrowband signals. Processing circuitry is configured for evaluating the plurality of uplink narrowband signals and providing data for a power profile that is associated with the uplink signals of a specific user device. Location measurement circuitry is coupled with the remote units and configured to receive data for a plurality of different power profiles from a plurality of different remote units wherein the plurality of power profiles are associated with the same specific user device, the location measurement unit configured for processing the power profile data from the different remote units to determine the location of the specific user device in an area of the distributed antenna system.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
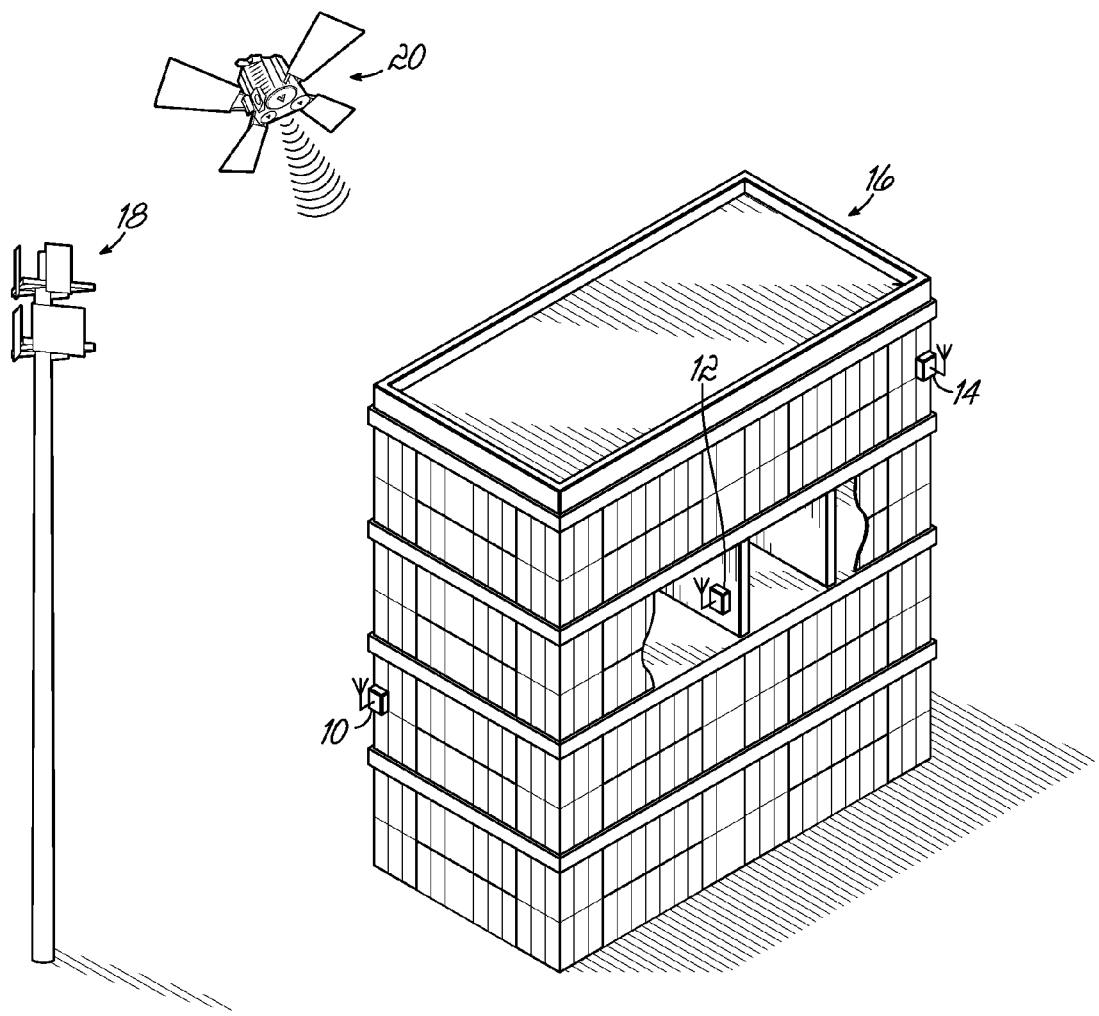
FIG. 1 illustrates an exemplary system with multiple sensors positioned in and around a building.

Existing outdoor solutions for the location of mobile devices cannot easily be used with the same accuracy in indoor or other confined areas and spaces. As illustrated in FIG. 1, location 10, 12, and 14 may be placed in and around a building 16 to expand the ability to locate a mobile device from base station 18. The location of the sensors 10 and 14 located either outside the building 16 or inside near a window may determine their location based on RF transmissions with a plurality of local base stations, such as the base station 18 (or a repeater) for example. Alternatively, the locations of location sensors 10 and 14 may be determined from GPS 20 signals. However, the location of sensor 12 may not be readily known as the RF signals from the base station 18 and/or signals from a GPS 20 may be blocked or shielded by building 16, inhibiting a direct path for providing location information even if the location of sensor 12 was known relative to the building 16. Furthermore, even if the sensor 12 were able to transmit its known location, if this sensor is moved to another part of the building 16, the location information of the sensor would need to be updated so that it does not transmit incorrect location information.

Figure 2:
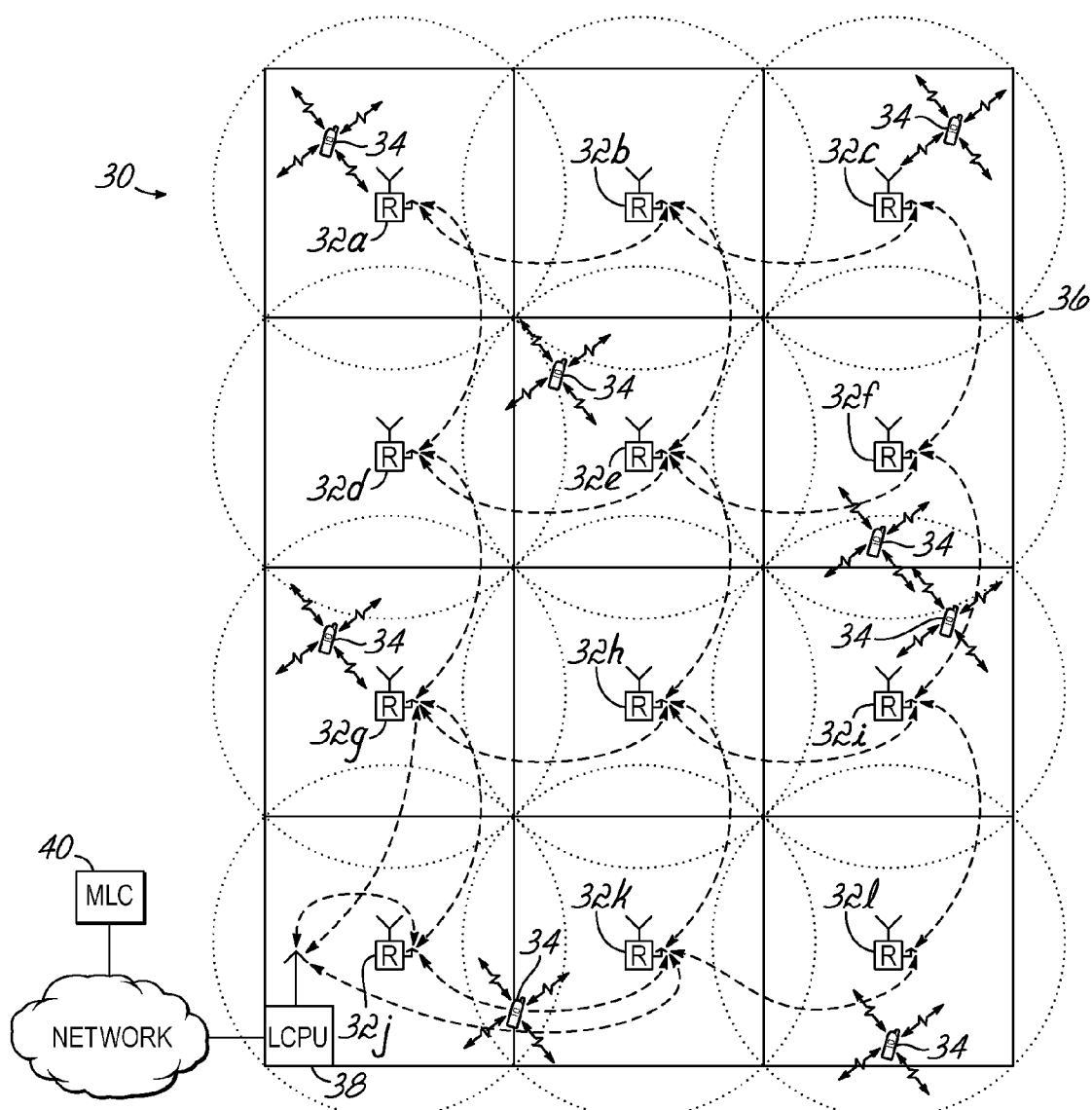
FIG. 2 is a diagram showing an exemplary sensor network.

To overcome these problems and referring to FIG. 2, embodiments of the invention provide a localization system 30 of distributed localization sensors 32a-32l, for example, shown in FIG. 2 that may assist in the accurate determination of a position of a mobile device 34 within a confined space 36, such as a building. The localization system 30 includes sensors 32a-32l configured to determine their own position as well as determine the proximity of a mobile device 34 to one or more sensors through the detection of RF energy. In some embodiments that sensors 32a-32l may be further configured to capture the actual RF signals digitally, process them, and then transmit the digital captures in a data reduced form with time stamp and sensor coordination information to a centralized location capture processing unit 38 (LCPU). The LCPU 38 may further process the captured RF by decoding it to determine if an actual mobile device 34 was present or an actual 911/112 call was placed. In other embodiments, other activities may trigger location based services, such as proximity detection for message or advertisement delivery, for example. These activities could be network triggered or could be triggered through the mobile device 34. The LCPU 38 may be configured to be connected to a mobile location server 40 or equivalent system that has the specific RF details of a voice call or data communication line, so that the frequency, time slots, encryption codes, and other required details to capture and decode the mobile connection are known to the sensor system 30 and the LCPU 38. This allows the LCPU 38 to determine or confirm the presence of a mobile device 34 in a specific location within the sensor network 30 area. Adding difference detectors to the sensors 32a-32l in one exemplary embodiment may allow the RF digital capture to be accompanied with additional information described further below. Should signals from the mobile device 34 be received by multiple sensors 32a-32l, an even finer resolution of the position of the mobile device 34 may be established through trilateration using RSSI differences, time differences of arrival or a combination of both. The synchronized captures of multiple sensors 32a-32l adjacent to the mobile device 34 may be used by the LCPU 38. An example of a mobile device position with the possibility of trilateration is shown in FIG. 2. The mobile device 34 is shown in one position in the overlapping zone of sensors 32b, 32d, and 32e. The dotted circle around the sensor depicts the area in which a mobile device can typically be detected. FIG. 2 additionally shows the mobile device 34 in another overlap zone where sensors 32f and 32i overlap. In order to use the RSSI of a mobile as an indicator of the distance from the sensor, in this example, the transmit power of the mobile needs to be known. If this parameter is controlled by the base station (as it is the case for most wireless communication standards such as GSM, CDMA, WCDMA, LTE, etc.) the RSSI level determined by the sensor should be used in a time synchronized comparison to the RSSI level of the same mobile originator determined at one or more neighboring sensors to ensure that the mobile is operating at the same power level for each RSSI level.

One aspect of the sensors 32a-32l used in embodiments of the sensor network 30 is the ability of the sensors 32a-32l to determine their own position without the interaction of the user or installer. In order to accomplish this, the sensors 32a-32l use multiple approaches to determine position. One of the possible approaches used by the sensors 32a-32l is the use of a GPS/GALILEO system receiver or other similar positioning systems receiver.

To facilitate the sensors 32a-32l in determining their own position, a receiver for a GPS 20 (FIG. 1) or other positioning system receiver may be integrated into each of the sensors 32a-32l. For example a GPS system 20 is be designed to a receiver signal level of approximately −130 dBm for an outdoor environment. Most contemporary GPS receivers have a sensitivity to acquire a fix and thus a position of approximately −145 dBm with some newer receivers approaching approximately −150 dBm. In order to maintain a fix on the signal, the GPS receiver sensitivity may be even lower, for example at approximately −160 dBm. This represents an extra 25-30 dB margin to the outdoor signal level. This may also be enough margin for an indoor GPS receiver in a sensor to acquire its own position given the long amount of time provided. An assisted GPS server that communicates the current satellite positions in the vicinity to the sensor may also help to speed up the acquisition of a position. The assisted GPS server may be either integrated in the LCPU or may as well be an external server that is configured in the sensor's settings. The severe multipath environment that is usually found in confined spaces, however, will likely require a more sophisticated GPS receiver and decoding algorithm for sensors of the invention. Equalizers and/or multiple correlation or rake receiver type architectures may be utilized in the sensors' GPS receivers to assist in improving the GPS receiver sensitivity and position accuracy. Furthermore, the position can be averaged to improve the errors. Position measurements with large errors or large deviation from current position fixes to former can be dropped to improve the accuracy. In some embodiments, the sensors 32a-32l maintain their last known position in a memory so that after a power drop the sensor can start immediately without the need to go through a lengthy position acquisition period. The position will always be verified in case the sensor 32a-32l has been moved to a new location. A battery powered motion sensor may determine any movement as an indication of a change in the sensor's position while the unit was powered off.

Another feature of an embodiment of the invention for the sensors 32a-32l to determine their position is a sensor mesh network 30 where each sensor 32a-32l determines its relative position to its neighbors using propagation path loss measurements or propagation delay measurement of inter-sensor communication signals or sensor beacon signals transmitted at low RF power. For a sensor 32a-32l that is unable to acquire a strong enough GPS signal level, the relative position to adjacent nodes or sensors may be determined by the measurement of the RSSI level of the received beacon signals of adjacent nodes/sensors. Alternatively, the propagation time delay may be used, which requires a highly accurate common timing synchronization between the sensors/nodes 32a-32l in the sensor mesh network 30. The sensor 32a-32l in the mesh network 30 may either determine its absolute position by itself (if it has a unique solution) by trilaterating its position through the distance measurements to neighbor sensors with known positions. In another embodiment, the sensor may send its relative position measurements to a LCPU 38 and the LCPU 38 may then collect the information of one or more other sensors 32a-32l in order to compute the absolute position of a particular individual sensor 32a-32l, which positions it then communicates back to each sensor 32a-32l.

A somewhat similar network approach may be used by sensors that are, for example, near windows or building outer walls, where each sensor 32a-32l in a sensor network 30 has the ability to determine its position relative to a RF source outside of the sensor mesh network 30, such as a mobile base station or other transmitter stations. The sensor 32a-32l may be able to accomplish its location determination through detection and decoding of various beacon signals that are transmitted by one or more base transceiver stations (BTS) 18 (FIG. 1) in the area and through measuring the RSSI level and/or the time difference of arrival with respect to those BTS's. In some embodiments, the sensors are equipped with a wideband receiver, which is used to receive and decode the signals of the other radio sources, such as base transceiver stations of a mobile network. From a level measurement collected, an estimate of the distance to the common source may be performed. The location of the BTS 18 is known to the LCPU 38, and therefore the relative distance of the sensor 32a-32l to the BTS 18 may be used to determine the sensor's 32a-32l absolute position. Again, trilateration may be used similar to the approach discussed above with respect to a sensor determining its position with respect to its neighbor sensors. If the LCPU 38 has access to a cell site database the approximate position may be determined from the cells RSSI level and/or the time delay delta time difference of arrival between the cells.

In another embodiment, the position of a sub-set of sensors 32a-32l may be entered manually. All other 32a-32l may then learn their position through the approaches set forth above, by determining the relative position to the known position of the configured sensors. The manual entry of the absolute position of a subset of sensors 32a-32l may allow a system to work when either no GPS receivers are integrated into the sensors or no reception of GPS signals is available even for the sensors 32a-32l close to windows or outer walls that have the best line of sight to a GPS signal source.

Embodiments of the invention allow for the combining of one or more or all of the above approaches as well. When using the combined approaches, the sensors 32a-32l may use a position determined to have the least error or lowest standard deviation, or the sensors 32a-32l may determine an average position using the various position results with weights depending on the standard deviation of the position measurement.

A primary function of embodiments of the sensors 32a-32l is to be able to capture a wide frequency range suitable to receive the transmit signals of the mobile devices 34 in its proximity. The sensors 32a-32l have a preferably low cost receiver capable of detecting RF energy, capturing the signal, and reducing the data size of the captured signal through filtering and decimation. The sensor is either capable of processing the signal for decoding in the sensor 32a-32l itself or is configured for sending the signal to the LCPU 38 for processing-intensive decoding. In some embodiments, receivers in the sensors 32a-32l are tunable over the range of approximately 30 MHz to 3 GHz, as this would cover most of the active service frequencies. Some embodiments may be expanded to approximately 6 GHz, to also cover all WIFI bands. The sensitivity of the receiver must be adequate to still receive signals at a signal-to-noise ratio that is high enough to properly decode the signal without degradation. The capture receiver of the sensors 32a-32l is configured to receive uplink or reverse link signals from mobile devices and the downlink or forward link signals from base transceiver stations (BTS) 18 or other transmitter sources. Preferably, overall cost of the implementation is low as the sensors 32a-32l are placed at relatively low distances with respect to the mobile device 34 with adjacent sensors 32a-32l at short distances to assist in increasing the accuracy of the location of mobile devices 34. The instantaneous bandwidth of the receiver in the sensors 32a-32l may be as wide as the maximum bandwidth of the standards that are to be expected in the coverage area, i.e., Public safety 6.25 kHz-25 kHz, GSM 200 kHz, WCDMA 5 MHz, WiMax 20 MHz, LTE 20 MHz, and WIFI 20 MHz.

Figure 3:
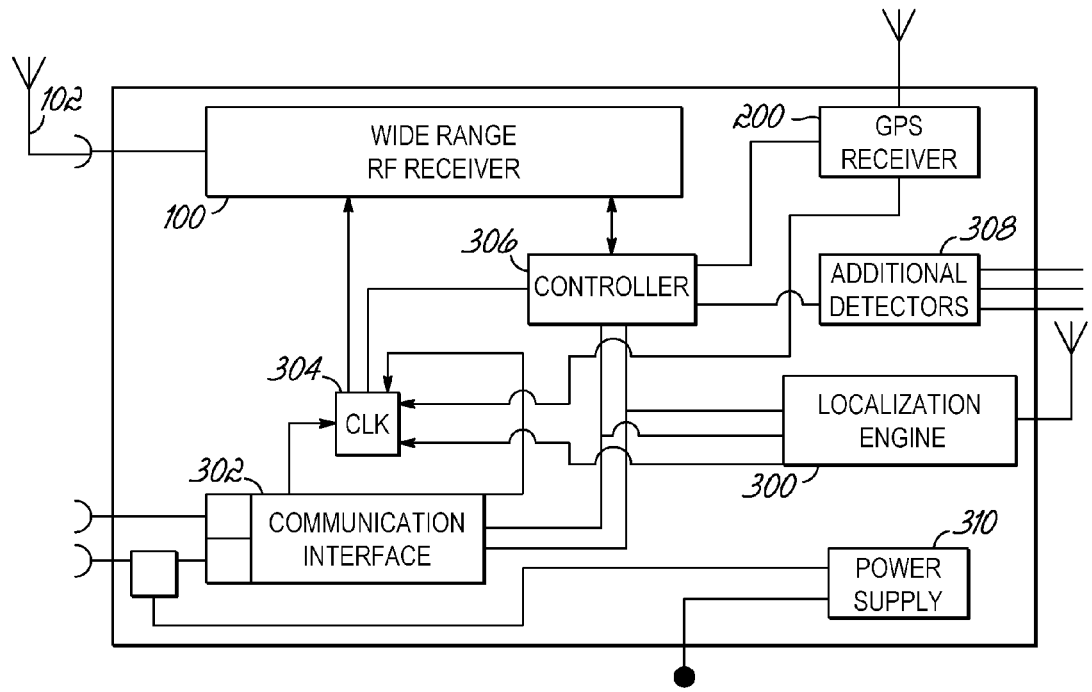
FIG. 3 is a block diagram of a sensor from the sensor network of FIG. 2.
Figure 4:
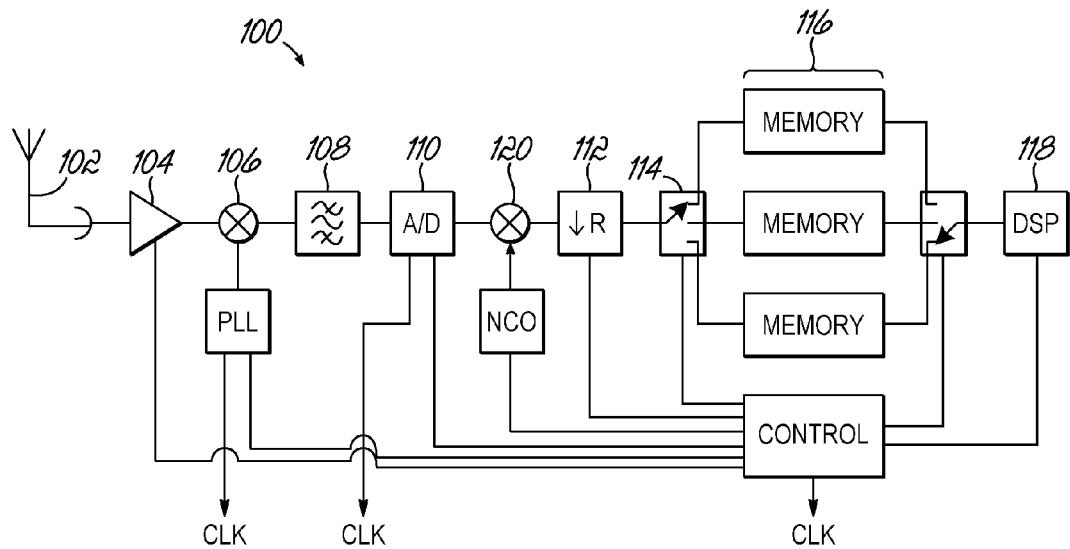
FIG. 4 is a detailed block diagram of an RF receiver in the sensor of FIG. 3.

FIGS. 3-4 contain block diagrams of the RF sensors 32a-32l and components utilized by embodiments of the invention. The sensors 32a-32l may include any or all of the following core elements. The sensors 32a-32l include a wide range RF receiver 100 with up to 22 MHz instantaneous bandwidth. Alternative embodiments may use even higher instantaneous bandwidths (for example, WIFI IEEE802.11n: 40 MHz, LTE Advanced: 100 MHz). The receiver 100, as seen in the block diagram in FIG. 4, includes an antenna 102 to receive the RF signals from mobile devices. A first amplifier is coupled to the antenna 102. A mixer 106 is utilized to convert the band of interest to an appropriate intermediate frequency (IF), or in case of a quadrature mixer used, the RF signal can be converted to a complex output (in-phase and quadrature components) at an intermediate frequency (IF) or directly down to the base band. A filter 108 is then used to select only a specific portion of the converted frequency band and to help anti-aliasing. The combination of circuits 104, 106, and 108 represent the RF front-end of the receiver. Analog-to-digital converter 110 samples the analog spectrum and generates a digital representation of the signal. A circuit 112 to apply digital filtering and signal conditioning as well as decimation may be employed to reduce the sample rate to an appropriate sample rate required for the signal of interest. Optionally, a digital mixer 120 between the A/D converter 110 and circuit 112 converts the signal in frequency to allow the selection of specific spectral components out of the digitized RF spectrum. Digital switch 114 allows the digital samples to be stored into a capture memory section of capture memory banks 116. Digital signal processor 118 may then be used to further process the signal captures for further data reduction and possible decoding of the signals. The combination of circuits 112, 120, 114, 116, and 118 represent the digital back-end of the receiver. Optionally, a plurality of digital receiver back-ends consisting of circuits 112, 120, 114, 116, and 118 may be coupled to the output of the A/D converter 110. This would allow the independent reception of wide-band spectra as well as narrow-band spectra. In practical implementation the circuits 112, 120, 114, 116, and 118 can be candidates to be integrated in a field programmable gate array (FPGA) or application specific integrated circuit (ASIC).

Figure 5:
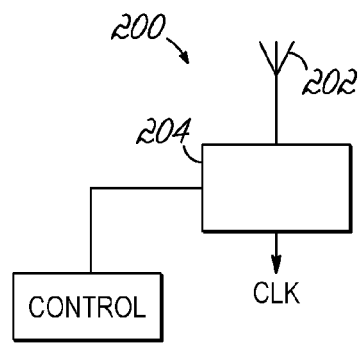
FIG. 5 is a detailed block description of a GPS receiver in the sensor of FIG. 3.

Embodiments of the sensors may also include a GPS and/or Galileo positioning system receiver 200, as detailed in FIG. 5. The receiver may include an antenna 202 that is attached to a sensor 204 in such a way as to maximize the reception of GPS or Galileo signals and minimize the interference from its own electronics. Other positioning system receivers for other global positioning systems may also be used as well.

Embodiments of the sensors also further include a localization engine 300 that may also support the GPS/Galileo position receiver 200 in case of weak signals. That localization engine 300 transmits a beacon signal via RF and measures the RSSI signal strength and/or signal delay from its surrounding sensors. With a known signal strength of the transmitter and an established propagation constant for the confined environment, the localization engine 300 may determine the distance to the various surrounding sensors 32a-32l that it receives signals from. Path loss is usually expressed in dB. In its simplest form, the path loss can be calculated using the formula:

$$L = 10n \log_{10}(d) + C \quad (1)$$

where L is the path loss in decibels, n is the path loss exponent or propagation constant, d is the distance between the transmitter and the receiver, usually measured in meters, and C is a constant which accounts for system losses. Similarly, the propagation delay or differential delays may be used as the mechanism to determine the distance to the adjacent sensors 32a-32l in a synchronized sensor network. The sensor 32a-32l should at least receive the beacons of three or more adjacent sensors 32a-32l and therefrom, the sensor 32a-32l may determine its own relative position to its adjacent sensors 32a-32l though trilateration. If two of the adjacent sensors 32a-32l know their absolute position, either through the GPS system or through trilateration, the sensor 32a-32l may then be able to determine its own absolute position. Eventually all sensors 32a-32l should be able to determine their own position in the confined area. In an alternative embodiment, the centralized LCPU 38 receives all beacon RSSI or delay measurement results for the various sensors 32a-32l and computes the absolute location of the specific individual sensor 32a-32l, which it then communicates back to the sensor 32a-32l with regular updates. In one embodiment, the transceiver of the localization engine 300 is used for inter-sensor communication, as well as for the sensor communication to the LCPU 38. For example, ZigBee radio components might be used for that specific purpose.

In another embodiment, a communication interface 302 may also be utilized to allow the sensor 32a-32l to communicate with other sensors 32a-32l or the LCPU 38. The communication may be wired using cable (twisted pair cable such as CAT5e or CAT6a, coaxial cable such as RG6, optical fiber such as single mode or multi-mode fiber or plastic fiber, or other types of cables) or wireless (ZigBee or another suitable standard). An on-board clock 304 is used to provide clock signals to all the components in the sensor 32a-32l. The clock 304 may be synchronized via the communication interface 302, via the localization engine 300, or via the GPS/Galileo receiver 200. Alternatively, an outside signal from an adjacent base station 18 may be captured with the capturing receiver 100 and used to synchronize the sensor 32a-32l with a central clock. A controller may select which source is used to synchronize the clock 304. Additional detectors 308 may be added to the sensor 32a-32l to expand its capabilities, as discussed below.

The sensors may also include an internal power supply 310 that supplies all the components with the required power. An input to the power supply may either be a local input or alternatively may be remotely supplied via a wired communication infrastructure. Alternative power sources such as solar cells can be used to provide the minimum power of the sensor at perhaps reduced functionality. An integrated chargeable battery may be used as a backup for limited time periods of power failures. Controller 306 is the central control element for each sensor 32a-32l. Controller 306 controls the wide range capture receiver 100, receives position data and controls the GPS receiver 200, controls and receives measurements from the localization engine 300, and uses the communication interface 302 to communicate with the LCPU 38 as well as possible communications with other sensors 32a-32l. The controller 306 may keep an absolute timing reference to allow for a synchronized capture on different sensors 32a-32l. The absolute timing may be acquired through the GPS receiver 200, the capture from adjacent base stations 18, or the communication link in the communicate interface 302.

Communication between the sensors 32a-32l may be established using multiple approaches. The sensors 32a-32l may communicate via wired connections or through a wireless mesh network structure. One possible standard that allows the mesh network to communicate is the ZigBee standard. The standard was designed to supply multi-hop "Wireless Sensor Network" (WSN) architecture. The maximum bit rate is 250 kb/s and the transmit power is limited to 0 dBm. Therefore the maximum distance between the sensors 32a-32l is limited to approximately 10-75 m (approximately 33-236 ft). The wireless transmission may be encrypted as well. ZigBee radio components may allow both the communication between sensors 32a-32l as well as the self-localization of the sensors 32a-32l using built-in localization engines 300. Encryption for the sensor communication may assist in preventing intruders from modifying data that is sent and received.

Figure 6:
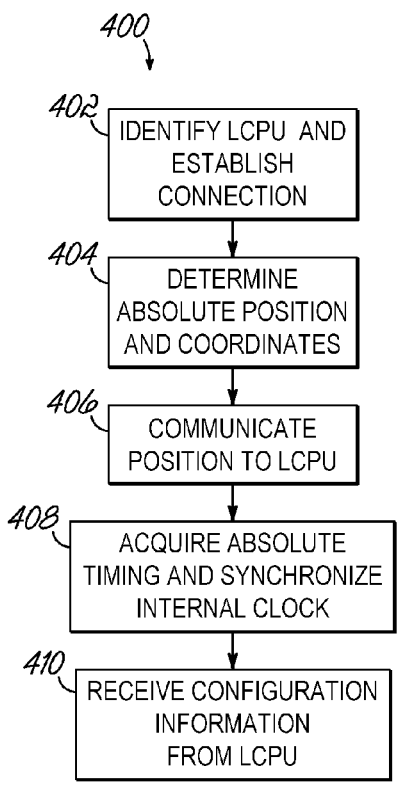
FIG. 6 is a flowchart of a start up process for the sensor network of FIG. 2.

After installation and switching the sensors on for the first time, the sensors perform a start up process. FIG. 6 contains a flowchart 400 of this process. The communication link is started. The LCPU address is identified and a connection is established with it (block 402). If the sensor communication is using a RF mesh network link, each sensor may be configured as a router. The sensor then determines its absolute position and coordinates (block 404). In some embodiments, this may occur in stages. For example, as a first stage, the sensor, if equipped with a GPS receiver, may try to locate GPS signals to determine its position. If the sensor does not have a GPS receiver, or if GPS signals are unavailable, then at a second stage, the sensor may communicate with other sensors to obtain its relative position to those sensors. From this relative position, the sensor can then determine its absolute position and coordinates. The position information is communicated to the LCPU (block 406). An absolute timing is acquired and the sensor's internal clock is synchronized to the system clock as determined by the LCPU (block 408). The LCPU may then configure all sensors to either wait for a specific capture command and/or set a threshold-based trigger for a set of bands (block 410). In case of the threshold-based trigger the capture receiver may actively scan the bands for a strong signal. The LCPU performs a scan of received base stations and decodes their unique identity also called Cell Global Identity (CGI). The CGI for a GSM network, for example, consists of the Mobile Country Code (MCC), the Mobile Network Code (MNC), the Location Area Identifier (LAI), and the Cell Identity (CI). The LCPU identifies all the different CGIs it is able to detect, sorts them according to the different network operators, and registers the CGIs of one operator at the MLC or GCS (Geolocation Control System) of the equivalent operator. For example, on one embodiment, the LCPU is configured with the address of the MLC for one operator. After the initial configuration LCPU auto-registers at the MLC of one operator and in that registration includes the detected CGIs of the network of that operator. Either an open standard protocol could be used or a proprietary protocol. Embodiments using auto-registration of the LCPU should include:

a. Location of the LCPU as physical street address as well as the latitude and longitude.
  b. Manufacturer and product details, such as what protocols and standards are supported.
  c. Details on the location request queue, which is a list that contains the location requests the LCPU needs to process.
  d. Status information such as alarms, events, hardware and software configuration and revisions, for the presence as well as the past.
  e. Authentication and encryption public key to allow the authentication of a LCPU and to protect the MLC-LCPU connection from being interfered with or otherwise accessed.

The location request received by the LCPU contains all required information to locate and follow the uplink signals of the mobile in question. The LCPU adds a new task to the task stack which will be processed in the sequence of reception. Once a task is ready to be activated it tasks the sensors to take captures for the specific UL channels and either lets the sensors decode the signal captures or processes the captures after having received them from the sensors. Depending on the standard a detection of the downlink signals might be required to acquire time synchronization to the base station either directly before the uplink signals are captured and analyzed or as an ongoing process after the first decoding and registration of the CGIs. The location response can contain information on whether or not the mobile was detected, the LCPU position and the more precise position derived from the mobile's proximity to the sensor or sensors such as more precise latitude and longitude and height, or in building or confined space terms (building area, floor number, room or hall number, row or section of stadium or theatre, etc.).

Figure 7:
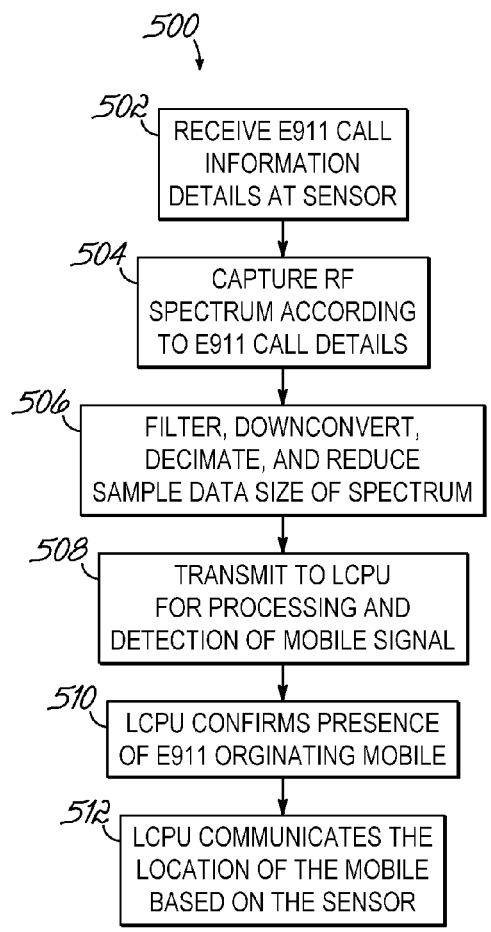
FIG. 7 is a flowchart of the operation of the sensors in the sensor network of FIG. 2.
Figure 8:
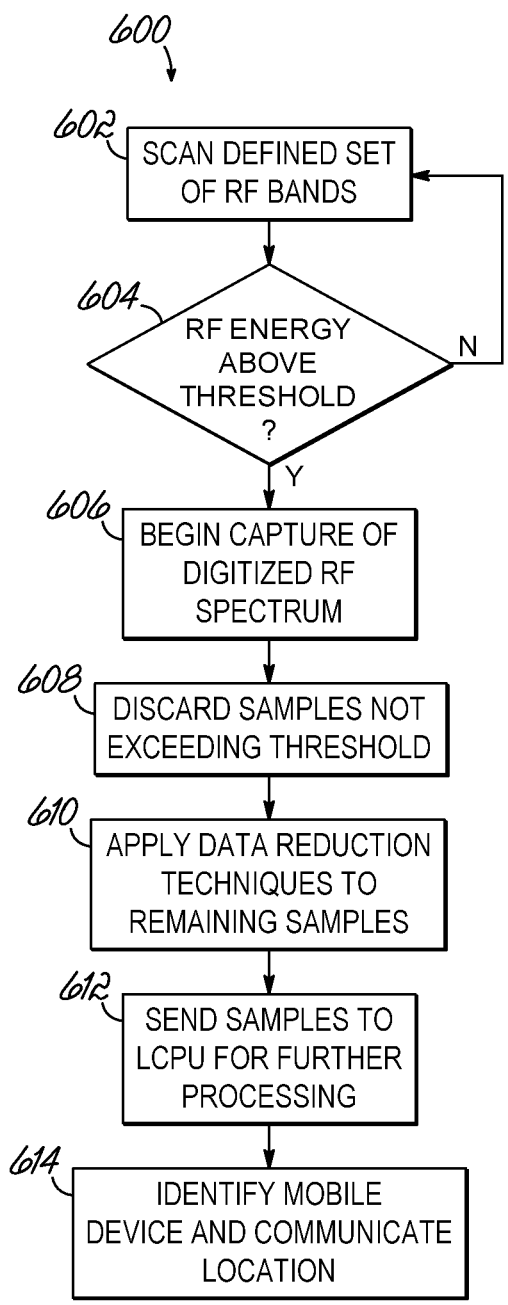
FIG. 8 is a flowchart showing an alternate operation of the sensors in the sensor network of FIG. 2.

During operation and as seen in flowchart 500 in FIG. 7, the sensor network may perform the following. A mobile location center (MLC) or other system may send E911 call information details. This information may include all of the information required to find an active E911 call and properly decode and decrypt the call to confirm the presence of the mobile device in the area of a sensor (block 502). In other embodiments, events triggering the sensor's operation may include a location based service geo-locate request, a mobile phone user application location request, or a signal above a threshold. The mobile phone user application may be a Google Mobile application that requests for the presence of a DAS or repeater system in order to be more exact in the determination of the mobile's position in applications running on the mobile equipment. The capture receiver of the sensor will then capture the RF spectrum according to the information provided (block 504). Either the sensor starts to decode the signal in order to identify the presence of the call, or it just filters, down converts, decimates and further reduces the sample data size to no less than one sample per symbol of the mobile communication standard (block 506) in order to send it to the LCPU for further processing and detection of the mobile signal in question (block 508). The sensor might discard samples that do not exceed a predefined threshold as the low signal level might indicate that no mobile signal is present between periods of transmission. Each time a gap is introduced due to the discard of samples a time stamp has to be introduced at the beginning of the next continuous block of samples to allow the properly timed decoding of the uplink signals. The LCPU receives the capture data and processes it to decode and confirm the presence of the E911 originating mobile (block 510). The LCPU then communicates to the E911 center (MLC or other system) the location of the mobile device (block 512). Alternately, and as shown in flowchart 600 in FIG. 8, the sensor may operate using a RSSI-based trigger mechanism. The capturing receiver in each sensor will scan a defined set of RF bands (block 602) and identify RF energy above a configured threshold (block 604). Ideally a fast scanning mechanism is implemented to avoid missing the presence of a signal of a mobile device. If no mobile device is detected ("No" branch of decision block 604), the sensor continues to scan in block 602. Once the transmission of the mobile device is detected ("Yes" branch of decision block 604), the capturing receiver will start the capture of digitized RF spectrum and remain in the frequency long enough to wait and capture further signals (block 606). Out of the captured data only the samples exceeding the predefined threshold will be kept (block 608) and further processed applying data reduction techniques (block 610). In case of a hopping GSM signal, the capture needs to span over the entire RF band where the hopping channels are expected. The data is then either kept for a while as a preemptive mechanism for a possible E911 call or sent to the LCPU for further processing and decoding of the singles to positively identify a specific mobile (block 612) and communicate the location of the mobile device. The results are then sent to the upper layer system for E911 location service or location-based configuration (block 614). The LCPU may use the collected data as well to determine traffic within the confined area. The scanning mechanism may employ one of a number of methods. For example, a very fast but coarse method is to monitor the various bits of the A/D converter. If a higher significant bit is triggered at the output of the A/D converter a higher signal level is expected in somewhere the entire digitized RF band. Another method would be the implementation of a RMS power $P_{RMS}$ detection by using the square of digitized signal $V_{RMS}(t)$ to obtain the RF RMS power of the digitized RF signal as given by the equation below:

$$P_{RMS} = \frac{V_{RMS}^2(t)}{R} = \frac{1}{R} \cdot \frac{1}{n} \sum_n x^2(t)$$

The parameter n defines the length of the digitized capture the RMS power is calculated over. R is the input impedance of the A/D converter 110. Still another way to implement the scanner mechanism over a smaller bandwidth than the entire digitized spectrum is to use a back-end of the digital receiver (blocks 112, 120, 114, 116, and 118 of FIG. 4). Several parallel back-end receiver scanner mechanisms may allow for monitoring of several signals in parallel.

Figure 9:
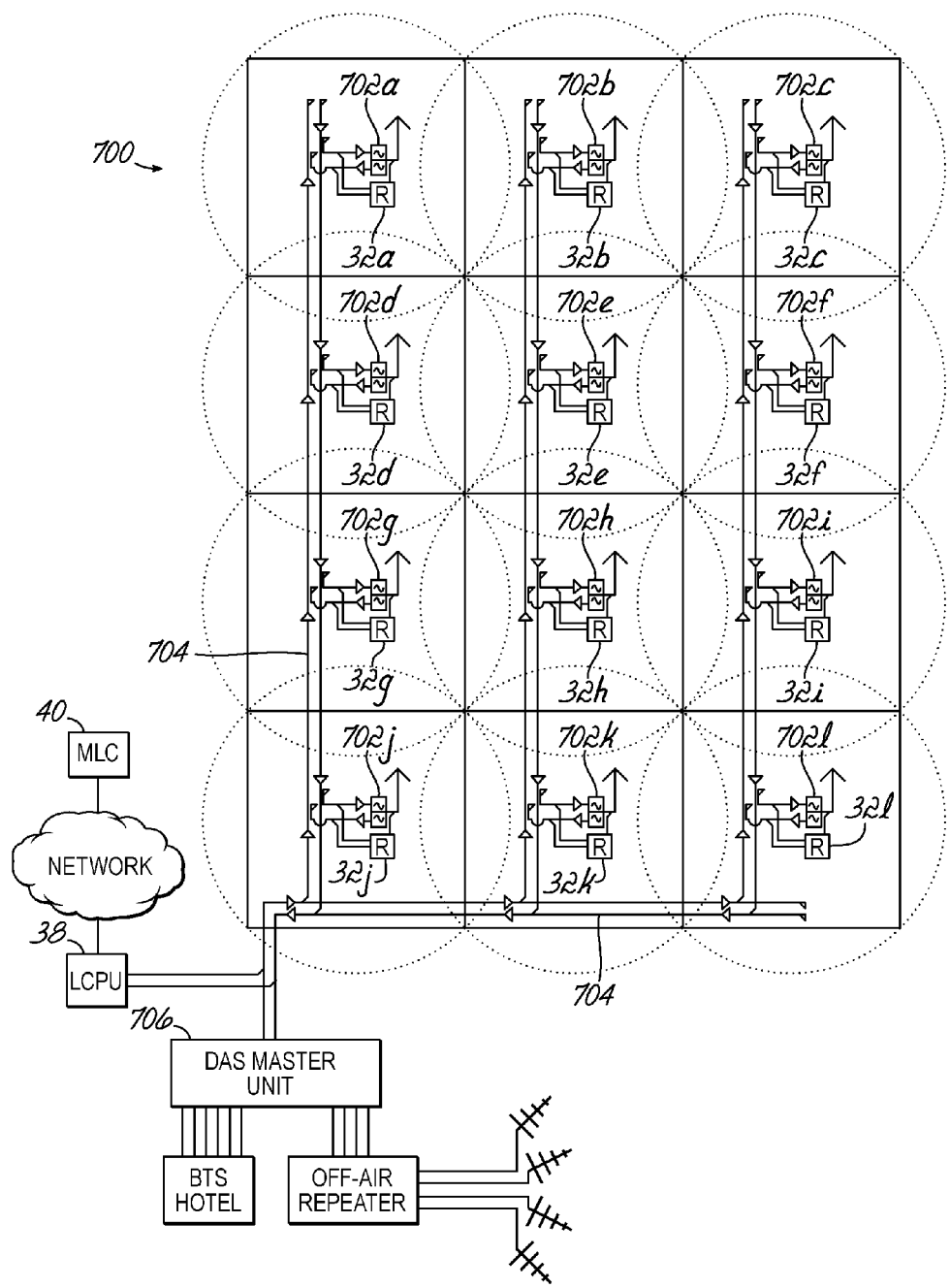
FIG. 9 is an alternate embodiment of the sensor network integrated with a distributed antenna system.

In an alternate embodiment, the sensor network may be combined with a distributed antenna system (DAS). This can be a DAS system with active coverage antennas which have amplifiers in both downlink and uplink direction to compensate for the distribution losses. The distribution of the signals can be as analog signals or over a digital signal flow. The DAS system could as well be a passive distribution system with a active high power driver at the head end and only passive components such as RF cable, RF splitters and combiners, and antennas. FIG. 9 illustrates one possible integration strategy of the sensor network in the distributed antenna system (DAS) 700. In the illustrated example, a sensor 32a-32l is integrated into each coverage antenna 702a-702l. This would allow the sensor 32a-32l the benefit from the available power at the DAS point as well as the possibility to use the feeding cable 704 for communication with the LCPU 38. In addition to the sensors at the coverage antennas there is the option to have one sensors at the master or at the LCPU itself. The LCPU could task that sensor with the steps to capture and decode the mobile signals. If the mobile is detected at this point a first response could be send back to the location requestor. In the next step the distributed sensor could be tasked with capture and detect request in order to allow a more finer location response from the sensors closer to the actual position of the mobile. In another implementation form the sensors can be combined with a macro or micro repeater. Here only one sensor is coupled to each coverage antenna. The LCPU can be either integrated in the repeater as well or there can be an external and remote LCPU. In those cases of only one sensor without the plurality of multiple sensors the location engine might not be required or deactivated.

In an alternate embodiment, the sensor network may be integrated within a distributed antenna system (DAS) or an element of a DAS system such as the master unit or the remote unit or an intermediate unit in between the master and remote unit. The level of integration may be a mechanical integration or a complete integration. In the complete integration the sensor may use existing blocks of the DAS remote or master unit. Examples of different embodiments having a complete integration with an analog DAS system may include:

1. The re-use of the antenna (equivalent to block 102, FIG. 4).
2. The antenna and the duplexer (equivalent to block 102 followed by a filter (not shown), FIG. 4).
3. The antenna, the duplexer, and the full front-end (equivalent to blocks 102, 104, 106, and 108, FIG. 4).
4. The controller, clock and power supply (equivalent to blocks 306, 304, and 310, FIG. 3).
5. The controller, clock, power supply, and communication interface (equivalent to blocks 306, 304, 310, and 302, FIG. 3).
6. A combination of 4 above with 1, 2, or 3 above.
7. A combination of 5 above with 1, 2, or 3 above.

The sensor may use existing components of the DAS system as listed in configurations 1 to 7 above. For example, in an integration with a DAS system incorporating a digital signal processing unit (digital DAS), additional elements present in the digital DAS system may be used for the sensor, so that the wide range receiver 100 may already be implemented as the front-end of the digital DAS system and only the parts 120, 112, 114, and 116 would need to be added to the already present hardware. As the implementation of the digital DAS system may incorporate a FPGA for the digital signal processing, the addition of the sensor to the FPGA may only require a firmware and/or software update. Elements 200, 308, and 300 (FIG. 3) would still be needed as additional hardware to the digital DAS system.

In an alternate embodiment, the sensor network may also have a signal generation scheme implemented to transmit a beacon signal at a low power level. The beacon would be modulated according to the mobile network standard and carry the required information to be identified as a neighbor base station by the mobile devices. The frequency or scramble code would need to be included in a neighbor cell list of the serving BTS. As the mobile device performs the neighbor cell scan it may discover the pseudo cell and report it back to the network. This may enable the network to offer location-based services to that specific mobile device as it was detected in the proximity of a confined area. To save the implementation costs on a sensor for each band and network operator, the beacon may be configured to change frequency and modulation in order to serve each operators network only for a limited time. This may be sufficient for the low mobility confined area to report the pseudo cell to the network. This time slicing of the beacons may assist in limiting the implementation costs. In embodiment of the sensor network being integrated with a DAS system, the pseudo cell may be centrally generated at the master unit 706 (FIG. 9) and then distributed via the DAS system 700.

The installation of the sensor can be facilitated through indicators on the sensor unit (examples may include colored LEDs, acoustic noise, screen message or indicator, etc.). The indicators are set by the controller 306 and can show whether enough neighboring beacon cells are received, a GPS signal is received or a position fix is acquired. The indicator can as well show the number of neighboring beacons received. This information allows easier position finding during installation. The battery back-up option will allow the sensor to be powered when moved around for the installation purpose.

Embodiments of the invention may also be used to detect an active mobile device in an area where at times no active device is allowed, such as in an airplane after closing the doors or in other restricted areas such as hospital Emergency rooms, United States Immigration and Customs areas, etc. Alternatively, embodiments of the sensor network may be equipped with other detectors to enhance its function. For example, detectors for heat or temperature may be included to detect fire, or depending on the sensitivity of the detector, for detecting the presence of a human being. Movement detectors may be employed to detect humans, animals, or vehicles in the confined space. Acoustic noise detectors may be used to detect screams, loud crash noises, or other noise. Fire, smoke, and/or gas detectors may be used combining the sensor network with the fire detection and alarming system. A microphone may be incorporated to capture audio in case of emergencies. Wide angle video cameras may be incorporated to take snap shots, which would be sent with the RF capture or function as closed circuit TV camera. Speakers may allow for coupling to a paging system and possible communicate with victims in the building. Additionally, the sensor network may be connected to the building alarming system, especially in cases where these additional detectors are integrated into the sensor.

The additional detectors also allow the sensor network to be tied into a security system of a building or confined area space. For example, the sensor network with additional fire detectors may be coupled into a security system of a house. In addition to the detection of fire, the presence of a mobile device might indicate the presence of a person. 911/112 calls placed outside of the structure under fire may also be located allowing the emergency services personnel to be more focused in the search of the individual in question. Alternatively, detection of a mobile device without the presence of a human as expected may be used in situations for locating or identifying independent explosive devices (IED).

Furthermore, embodiments of the sensor network may be coupled and/or combined with an IT installation of a structure. In one embodiment, the active device may be integrated into a telecom outlet interface plate, which is typically present in offices, meeting spaces, or hallways. The antenna for the RF capture receiver receiving signals of the mobile devices may be incorporated into the face plate of the outlet. Detectors for the presence of IT or telecom connectors could be integrated to allow signaling an active connection to the IT system. In addition, the sensor network may assist in locating specific outlet interfaces without the need to manually enter locations into a management system. As a further advantage in some embodiments, the wired IT infrastructure may be used to communicate and send the RF capture data to the LCPU. Integrating with a telecom outlet may also be beneficial from a power point of view. These outlets are generally located close to power outlets so the sensor could be easily powered. In alternative embodiments, the sensors may be mounted into the ceiling or a ceiling tile or behind a ceiling tile in the upper duct to be invisible. Directional antennas may also to limit the RF capture to a specific area or floor. Although, a typical indoor environment may not allow high directivity as objects close to the antenna and multipath environments typically deform antenna patterns.

Figure 10:
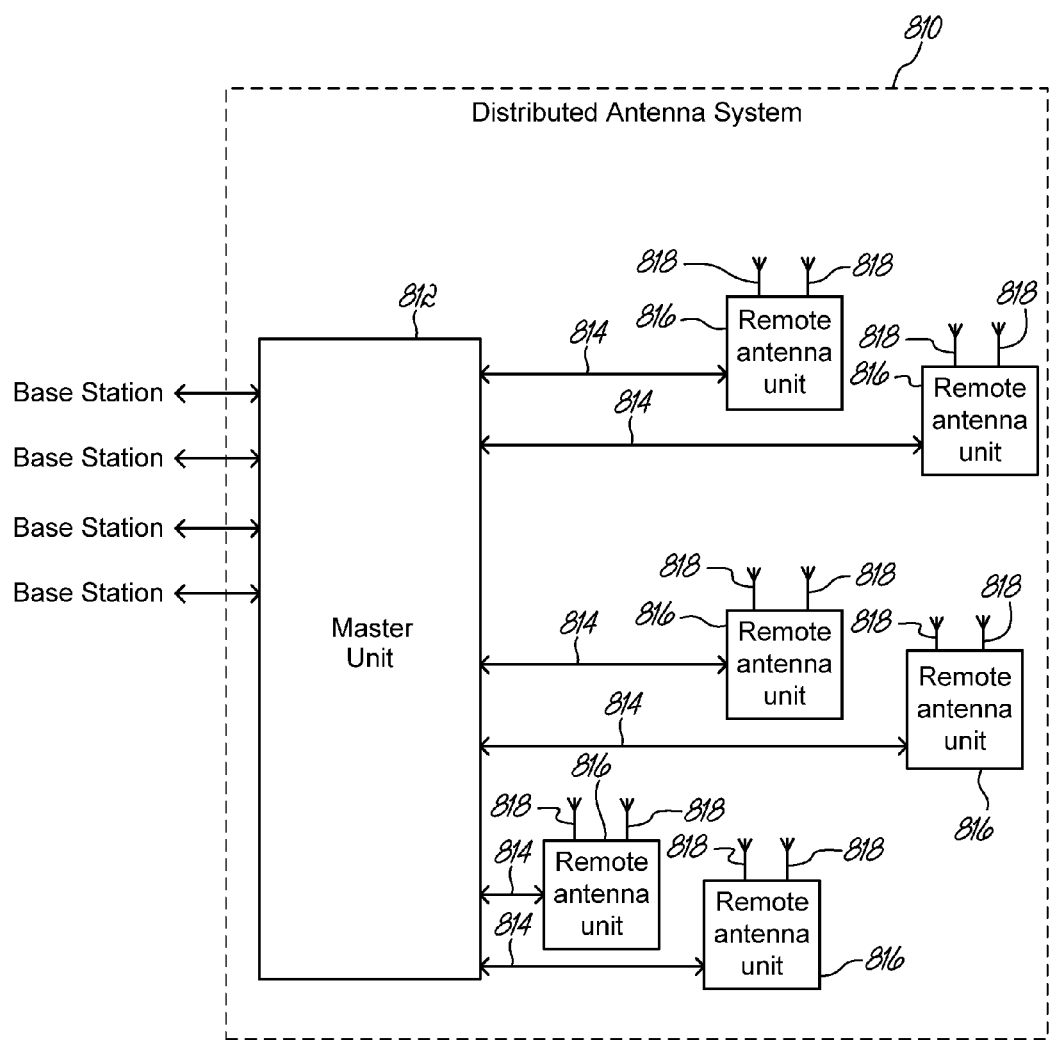
FIG. 10 is a block diagram illustrating an exemplary distributed antenna system for using the invention.

In still another alternative embodiment of the invention, FIGS. 10-16 disclose a signal repeating system that implements the invention and provides location information for a user in an inside, confined, or sheltered area where more conventional signal coverage is not available. FIG. 10 illustrates one exemplary embodiment of a system that might be utilized as a signal repeating system to distribute RF signals into an enclosed environment, such as a building, and used for implementing the invention, although other applicable wireless communication systems might be used as appropriate. The illustrated system is a signal repeating system, such as a distributed antenna system 810 that incorporates one or more master units 812 that are coupled with a plurality of remote antenna units located away from a remote to the master units to define a coverage area, such as in a building. Usually, the master unit(s) will be centrally located in a space such as a building, tunnel, or train and the various remote units will be scattered throughout the coverage area of a system. For example, different remote units might be located on different floors, and in different areas of a building. The master unit and remote antenna units are coupled through an appropriate signal transport and distribution system network 814 that may, for example, include suitable cable links or fiber links between the master unit and remote units. The various remote antenna units, or remote units 816, will each include, or will be coupled with, appropriate antenna structures 818 for wirelessly delivering downlink signals into the coverage area and receiving uplink signals through an air interface. In some embodiments, the remote units will incorporate an interface with multiple antennas, such as for handling MIMO (Multiple Input Multiple Output) signals and services, as shown in FIG. 10.

Generally, the master unit 812 interfaces with one or more signal sources, such as base transceiver stations (BTS) or base stations that define one or more coverage cells within an overall wireless communications network. While one master unit 812 is shown, multiple units might provide the functionality of a master unit. Furthermore, there may be other aggregation units (not shown) that are used between the master unit 812 and remote units 816 to aggregate and process the signals. Therefore, the invention is not limited only to the layout in the figures. The master unit receives downlink signals from the BTS's, and delivers those downlink signals via the multiple remote units, through the coverage area, to the mobile devices of multiple users in the coverage area (e.g., a building). The uplink signals from the mobile devices are then captured by the remote unit 816, and delivered as uplink signals through master unit 812 to the BTS's. The master unit, or some intervening, aggregating, or combining unit (not shown), combines the signals from the remote units for delivery to the BTS's. Master unit 812 might be coupled in a wired fashion, such as through a BTS hotel, or wirelessly to one or more base stations. The BTS will allocate time and frequency channel resources for the cell or area covered by the distributed antenna system.

Master unit 812 receives downlink signals that include frequencies over a very wide frequency bandwidth. For example, for each port of a master unit, as shown in FIG. 10, it may receive downlink signals having frequencies, and frequency bands that are used by multiple telecommunication operators and service providers. The telecommunication service providers may use different telecommunication technologies, including, but not limited to GSM, LTE, UMTS, CDMA, Public Services, etc. Such downlink signals are often in digitized form, as digital RF signals. The distributed antenna system 810 of the invention thus, acts as a digital repeater system. Those signals are then communicated through distributed antenna system 810, from a master unit 812, to the remote units 816, utilizing a multistage aggregation, transport, and distribution system or network 814, which includes the necessary circuitry, such as aggregating and combining units, and wired or wireless links for delivering downlink signals to the remote units and receiving uplink signals from the remote units.

More specifically, various carrier signals and technologies might be associated with a BTS. Each RF carrier that is associated with a given cell area supported by the BTS is split in the downlink path by the DAS master unit. The master unit then transports the RF signals to the multiple remote units, and, as such, the same RF signal of a given cell is split into multiple copies and distributed to the multiple remote units according to a specific simulcast factor that is defined by the number or remote units that are radiating the same BTS or cell signals. In the uplink path, the uplink signals of the different user mobile devices that are attached to a given BTS and cell are received by the remote units. All of the traffic associated with the RF carrier signals that are related to the same BTS and cell are combined together at the master unit, and fed into the appropriate uplink paths or ports at the master unit to be directed back to the BTS. A BTS scheduler allocates the available channel resources to the active user mobile devices in a given cell area, but does not having viability regarding the distribution of users in the coverage area. As a result, the BTS cannot estimate the user's position when that user is located in the coverage area of the distributed antenna system, such as in a building.

One illustrated embodiment of the invention, as discussed herein, implements a plurality of narrowband signals, which are monitored to determine a power profile for the various uplink signals associated with each remote unit. Specifically, power and timing information is determined for the detected active resources that are associated with a particular remote unit. That information is then directed to a location measurement unit that derives a user's position utilizing the information. In one embodiment of the invention, signals associated with GSM and LTE carriers at the remote units are analyzed for obtaining the power and timing information associated with multiple users for deriving a user's location, such as within a building.

Figure 11:
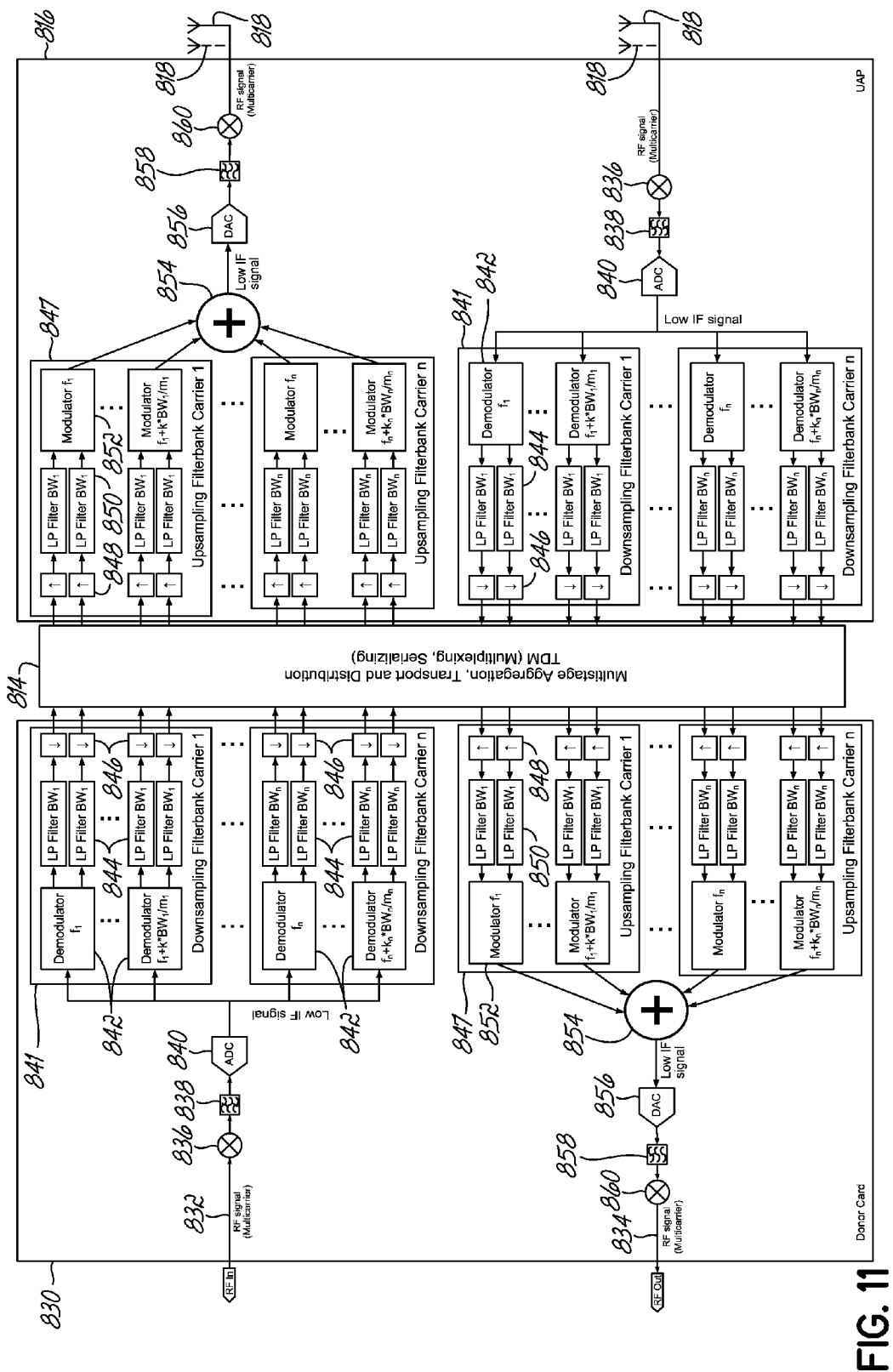
FIG. 11 is a detailed block diagram of one embodiment of the invention.

Specifically, referring to FIG. 11, in accordance with one embodiment of the invention, the various wideband carrier signals, or wideband multicarrier signals, in the uplink channel of a distributed antenna system, are decomposed and processed as multiple narrowband signals. In accordance with one aspect of the invention, the signals are decomposed and processed through a plurality of filter banks of narrowband filters associated with each carrier signal. To that end, the distributed antenna system of the invention implements a plurality of narrowband signals forming the intelligent distributed antenna system, as illustrated and discussed further herein. Additional details of such an intelligent distributed antenna system implementing narrowband signals is provided in U.S. Patent Application Ser. No. 61/939,445, entitled "TRANSPORT OF NARROWBAND SIGNALS FOR INTELLIGENT DISTRIBUTED ANTENNA SYSTEM", filed Feb. 13, 2014, which Application is incorporated herein by reference in its entirety.

FIG. 11 illustrates components of a distributed antenna system for processing signals in accordance with one embodiment of the invention that provides a set of narrowband signals for processing to determine the location of a user in a coverage area in accordance with the invention. FIG. 11 illustrates a downlink signal path and an uplink signal path, and circuitry associated with both the master unit and one or more remote units in the distributed antenna system.

Specifically, FIG. 11 illustrates a donor card 830, which may exist within a master unit 812, for example. The donor card provides a bi-directional RF interface, with one or more BTS's, in a wired or wireless fashion. The donor card couples through an appropriate multistage aggregation, transport and distribution mesh or network 814, with one or more remote antenna units 816, which might also be referred to as universal access points ("UAP"). The RF interface of the donor card 830 includes appropriate input ports 832 and output ports 834, for transceiving uplink and downlink signals with one or more BTS's. The downlink path extends from input port 832, through the distributed antenna system to the one or more antennas 818 of the remote antenna units 816. Similarly, an uplink path extends from the antennas 818 to the RF output port 834. The circuitry of the master unit, including donor card 830, supports multiple carrier signals 1 . . . n, and each carrier signal has a different bandwidth $BW_{1...n}$. Examples of different carriers include multiple GSM carriers, as well as LTE carriers and/or UMTS carriers.

A downlink RF signal received through port 832 is downconverted by appropriate frequency conversion circuitry 836, to an intermediate frequency (IF), and then filtered by low-pass filter 838. The IF signal is converted to a digital signal by appropriate analog-to-digital converter (ADC) circuitry 840, and is directed to a series of demodulators 842 and filters 844 and digital decimators 846. The series of demodulators, filters, and decimators form a downsampling filter bank 841 for each carrier signal 1 . . . n. In that way, the filtering circuitry is configured so the multicarrier downlink signals are decomposed or split into multiple downlink signals for each of the respective carriers. The carrier signals are then split and filtered into multiple narrowband signals, as discussed herein. A master unit might include a donor card and associated filter bank for each of the various GSM, LTE, and/or UMTS technologies handled.

After the narrowband signals are transferred through network 814 to one or more remote antenna units 816, the signals are further processed by an upsampling filter bank 847 for each carrier signal. The upsampling filter bank 847 includes appropriate interpolators 848, filters 850, and modulators 852 for reconstructing and upconverting the downlink narrowband signals of the various carrier signals 1 . . . n. Referring to FIG. 2, those signals are then combined to form an IF multicarrier signal, using adder circuitry 854. The digital signals can then be converted by appropriate digital-to-analog converter (DAC) circuitry 856, filtered by filter circuitry 858, and then unconverted to RF by upconversion circuitry 860 to be transmitted in the downlink direction by the one or more antennas 818 of the remote antenna unit 816.

A similar path exists for the uplink path to handle uplink signals from remote antenna 816, back to the BTS. Uplink signals are converted and processed into a plurality of narrowband uplink signals that are then used for determining the location of a user, in accordance with aspects of the invention discussed herein. To that end, since the analysis of the uplink signals is used for determining user location, a discussion of the uplink path and the circuitry therein is set forth.

Figure 12:
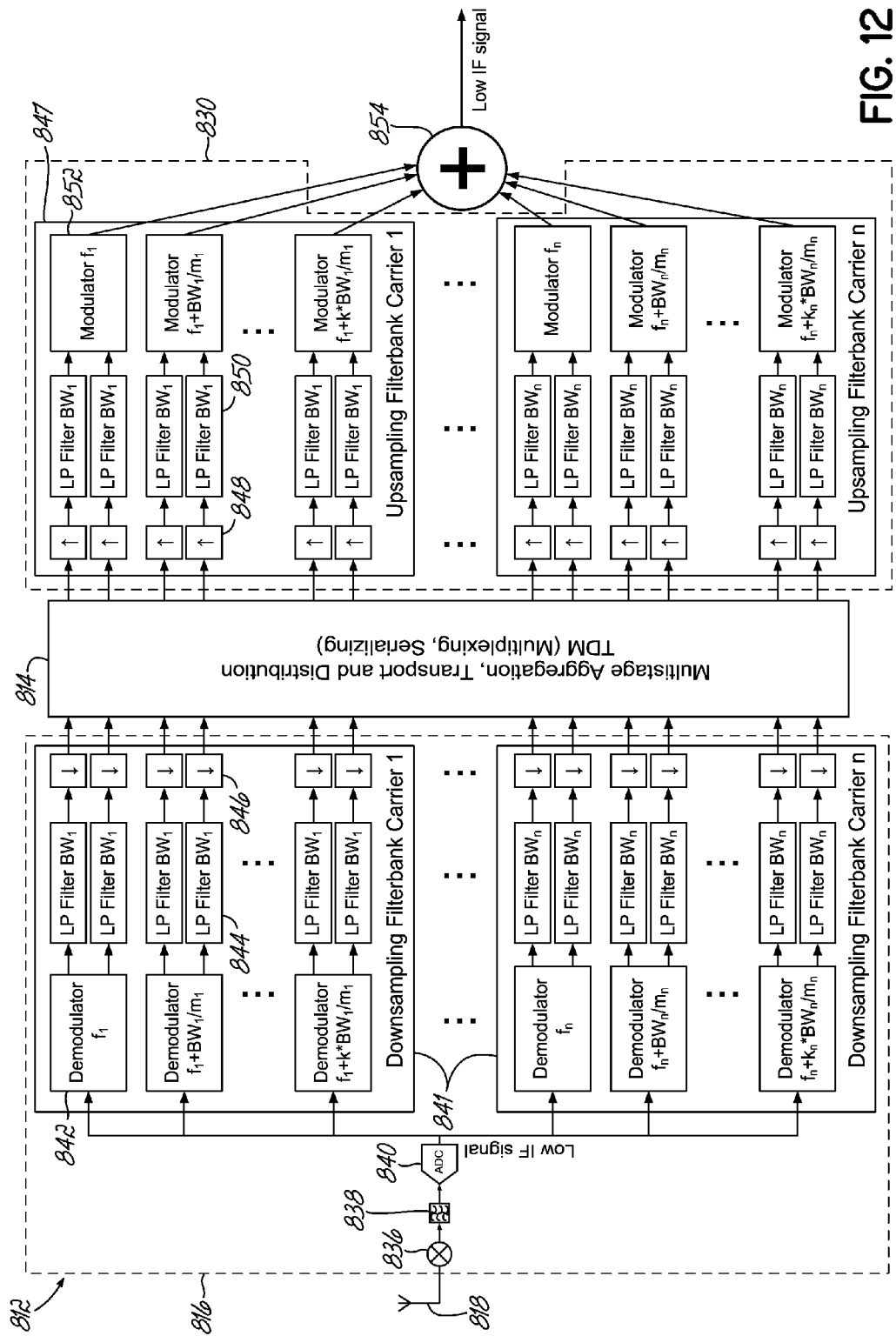
FIG. 12 is a detailed block diagram of one embodiment of the invention.

Turning to FIG. 12, one particular path is illustrated for uplink signals received by a remote antenna unit 816, then appropriately downconverted to a digital IF signal. The remote antenna unit receives multiple carrier signals that are converted to digital IF, as noted, and directed to the plurality of downsampling filter banks for each of the various carriers 1 . . . n. Each of the filter banks, through the appropriate demodulation, filtering, and decimation circuitry, provides a plurality of 1 . . . m uplink narrowband signals for each carrier signal 1 . . . n. In one embodiment, each of the m uplink narrowband signals can have the same bandwidth, with the set of the m narrowband signals from a specific filter bank corresponding to a specific carrier, as noted in FIG. 12. Alternatively, different bandwidth narrowband signals might be used.

As illustrated in FIG. 12, each filter bank of the illustrated embodiment includes a set of k complex demodulators 842 that are used to output a set of uplink narrowband signals that are equally spaced in a frequency band. The demodulator circuits output a complex base band signal, or I/Q signal. The complex demodulators 842 also output a frequency-shifted version of the specific input multicarrier signal while performing complex demodulation. The frequency shift that is performed by each demodulator 842 is represented as a function $$\frac{f_n + BW_n}{m_n},$$

with the term $f_n$ representing the lower edge frequency of the carrier, the term $BW_n$ representing the signal bandwidth of the complex narrowband signal, and the term $m_n$ representing a step width for the adjacent narrowband signals. FIG. 12 illustrates filter banks for carrier signal 1 and up to carrier signal n for yielding k individual narrowband signals for each carrier signal.

The low-pass filters 844 follow the complex demodulators 842, and can be selected to have or may be configured with the same pass band. The filter banks 841 also include digital decimators following the low-pass filters for decimating the digital signals to reduce the sampling rate of the downlink narrowband signals. Such decimation can allow the narrowband signals to be compressed, and allow for minimization of the number of bits used to represent each complex sample. Two paths are shown from the output of the demodulator circuits 842 for both the I component and Q component of the demodulated signals.

Various narrowband signals from the remote units can then be directed through an appropriate multistage aggregation, transport and distribution network 814, to a master unit 830. At the master unit, the signals can be interpolated, filtered, and then modulated, and combined as appropriate for each carrier to form a multicarrier signal that can be directed back to a BTS. However, in accordance with one aspect of the invention, the multiple narrowband uplink signals are further processed and analyzed to provide information regarding the interaction of one or more users and mobile devices, within the distributed antenna system, the information from the narrowband signals is used for determining the location of one or more users in the coverage area serviced by the system.

Figure 13:
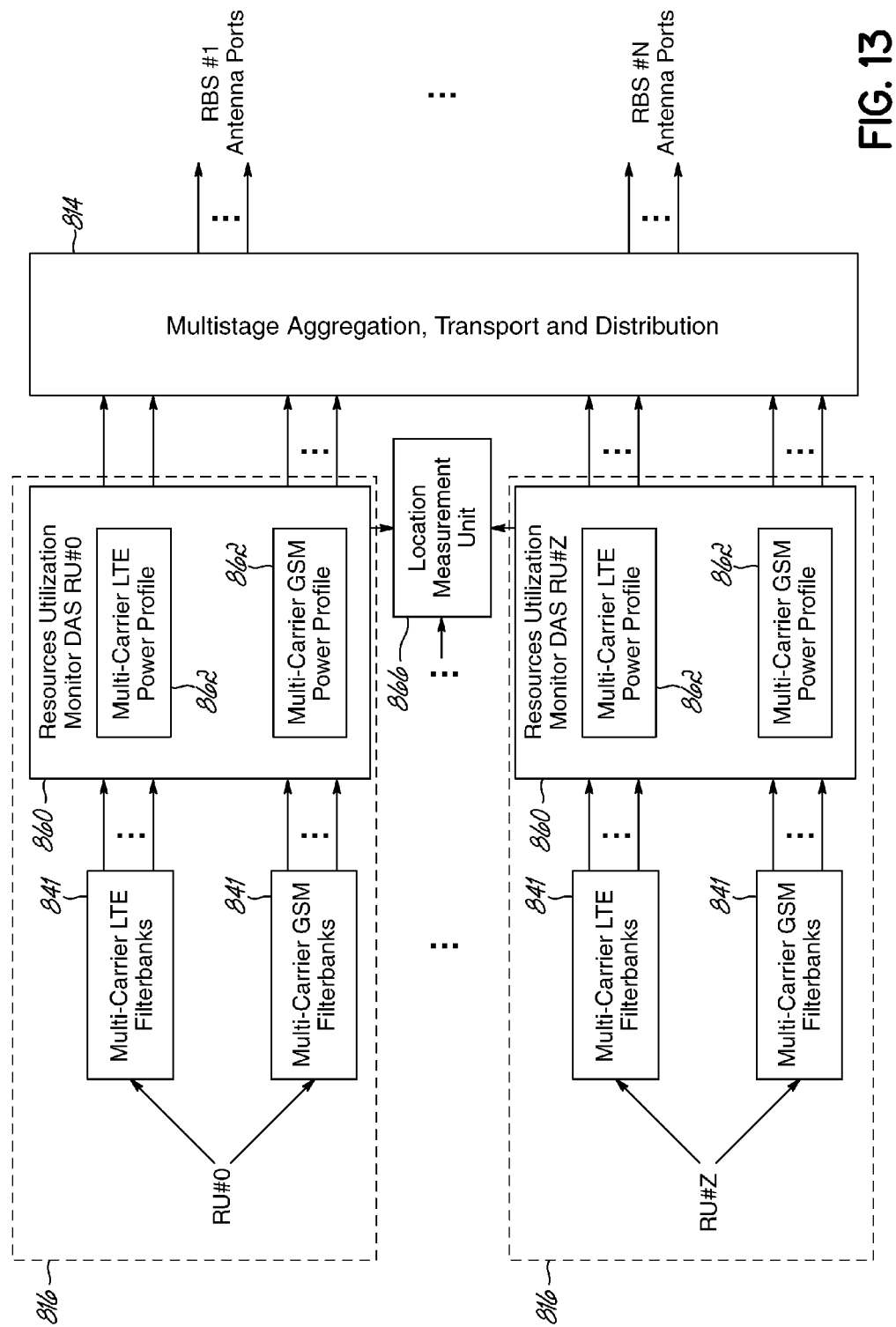
FIG. 13 is a detailed block diagram of one embodiment of the invention.

To that end, referring to FIG. 13, in one embodiment of the invention, each of the remote antenna units 816 (RU2 to RU#Z) of the distributed antenna system incorporates a resource utilization monitor (RUM) for processing the plurality of narrowband signals that have been provided by the filter banks 841. As illustrated in FIG. 13, and as noted herein, one embodiment of the invention further implements features associated with LTE carrier signals and GSM carrier signals for determining the location of a user. Therefore, the filter banks 841 are illustrated for multicarrier LTE signals and multicarrier GSM signals, as an example. The resource utilization monitor (RUM) units 860 receive the narrowband signals associated with each of the carriers handled by the remote antenna unit 816. Such carrier signals may be LTE carrier signals, or GSM carrier signals, as noted, or other appropriate carrier signals having timing and power control protocols, as noted herein. The RUM units have suitable processing circuitry for processing the narrowband signals and determining power density information for each of the multiple narrowband signals. The power density information includes power and timing information associated with each of those signals. Such an RUM unit 860 is disclosed further in U.S. Patent Application No. 61/980,728, filed Apr. 17, 2014, and entitled "DETECTING TRAFFIC LOAD FOR A TELECOMMUNICATIONS SYSTEM USING NARROWBAND SIGNAL MONITORING". which application is incorporated herein by reference in its entirety. The power and timing information that is detected for the active resources or active mobile devices by the RUM for each remote antenna unit are then directed to a location measurement unit (LMU) 866, as illustrated in FIG. 13. Each of the remote antenna units, and particularly, each of the RUM units 860 of the remote antenna units 816 are coupled with the location measurement unit 866. The location measurement unit estimates the users' position based on the power differences and timing differences for the various detected users. The frequency resolution of the various filter banks 841 has to be dimensioned according to the format of the specific uplink signal in order to track resource allocation for a remote antenna unit in the frequency domain. The invention can be applied, for example, to LTE SC-FDMA and GSM uplink signals.

As noted, initially, the multicarrier RF uplink signals of each remote antenna unit are split into the multiple narrowband complex signals using the appropriate filter banks 841. The process is applied to any uplink carrier frequency and format, including the noted LTE SC-FDMA and GSM formats. Each carrier handled by a remote antenna unit is processed by a filter bank having a specific narrowband filter grid, as shown in FIG. 12. For each carrier signal format, the filter bank is dimensioned in order to match with the resource allocation in the frequency domain. To that end, it will be assumed that information regarding the number of carrier frequencies, the channel bandwidth, and the format served by each distributed antenna system remote unit is available at the system configuration of the distributed antenna system. It is also assumed that the measurements taken at the remote antenna units are synchronized in time.

Each of the remote antenna units 816 will include an RUM component. The RUM component 860 measures the power profile information in the time and frequency domains for the uplink signals for all the LTE and GSM carriers at each remote antenna unit. The RUM utilizes the multiple narrowband signals that are associated with each carrier for determining the power profile information.

For LTE SC-FDMA uplink signals, the per-user frequency resource allocation can be 180 kHz, which may correspond to a single physical resource block (PRB). The individual bandwidth of each narrowband signal can be in the same order to reduce the effects of energy spillover from user devices operating adjacent in frequency.

For GSM uplink signals, TDMA schemes over a single 200 kHz carrier, and FDMA schemes over different carriers, frequency hopping can be used. Using frequency hopping, each GSM carrier of 200 kHz bandwidth can be accommodated with a filter bank having this frequency resolution.

Figure 14:
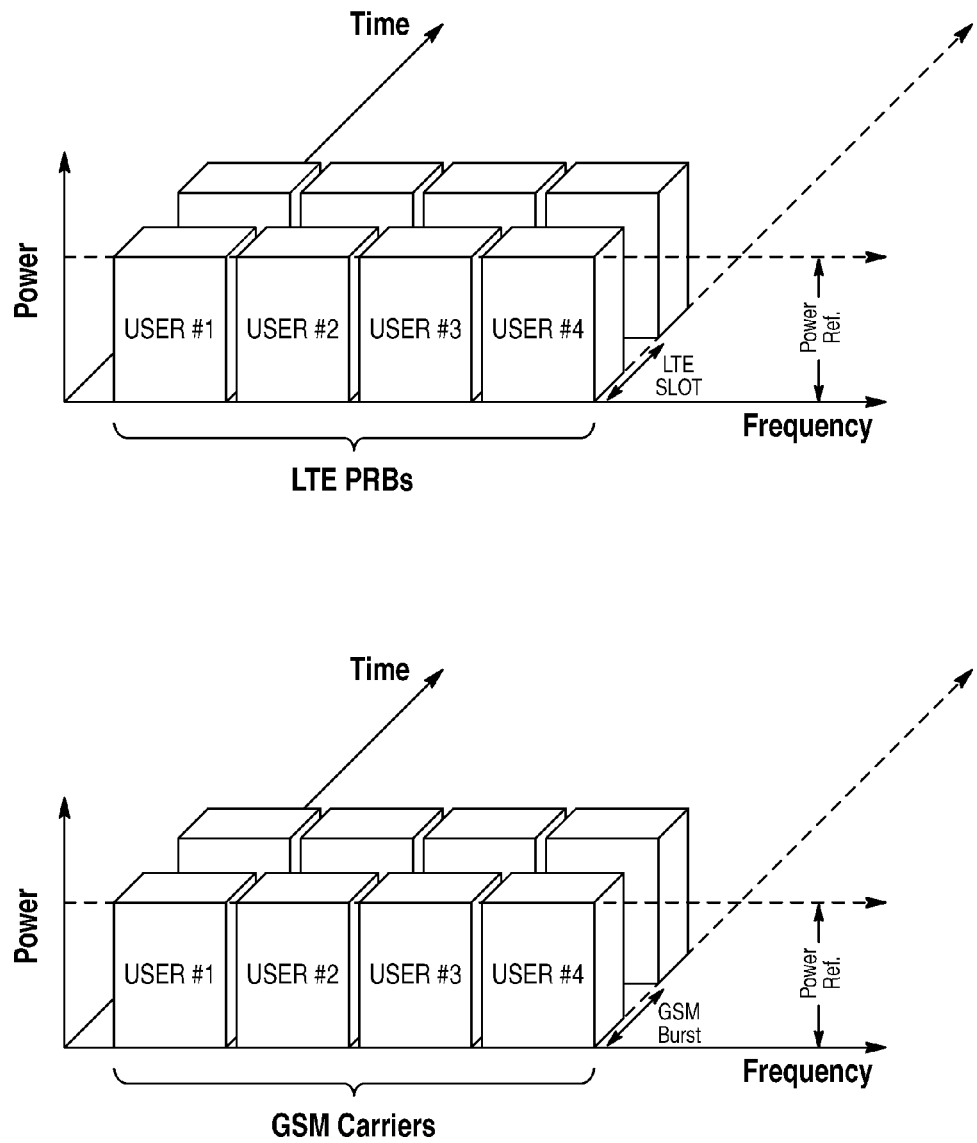
FIG. 14 is an illustrated diagram of power profiles used in accordance with one aspect of the invention.

Each filter bank splits the multicarrier RF input signal into a number of narrowband complex signals (IQs), as noted. The sample rate of each complex signal is decimated to a minimum acceptable value. The collection of IQ samples for the same remote unit are sent to the resource utilization monitor (RUM) 860. Within the RUM 860, narrowband signals of the same carrier are processed together. For each carrier, for example, determining the power profile can include determining the square of the momentary power. The square of the momentary power can be calculated by adding the square of the I and Q samples. Determining the square of the momentary power can be performed for every narrowband signal at every sample time. A power profile (e.g., the square of the power density) is then generated and made available for each carrier. Power profiles are shown in FIG. 14.

After processing by the resource utilization monitor 860, the IQ samples are provided to the multistage aggregation, transport, and distribution circuitry 814. At the output of the multistage aggregation, transport and distribution circuitry, the signals can be directly converted into low intermediate frequency (IF) signals, as shown in FIGS. 11 and 12, and routed to the antenna ports of the serving base transceiver stations (BTS's).

The resource utilization monitor 860 can apply a different monitoring function to power profiles related to different signal formats, depending on the time domain characteristics of the received signal frame. Power profile values calculated at each sample time can be averaged over a time window that is equal to the time resolution in order to correspond to changes in the resource allocation applied to each specific carrier format. The frequency resolution of the power profile may be defined by the filter bank resolution. By calculating power profile values calculated at each sample time and averaging over a time window, the power profile of each carrier can be estimated in either or both of the frequency and time domains.

In GSM, a burst period can be defined to be 0.577 msec. A TDMA frame includes eight burst periods. The GSM frequency-hopping rate corresponds to the TDMA framing. One TDMA frame can be 4.615 msec. The time resolution of the power profile can be at least equal to the GSM burst. For UMTS, the frame duration is 10 msec, but the shortest time transmit interval (TTI) for resource scheduling can be 2 msec. Time slot resolution of the power profile can be at least equal to the TTI duration for each UMTS carrier. For LTE, the physical resource block duration can be equal to a time slot of 0.5 msec. Time slot resolution of the power profile can be at least equal to the physical resource block duration for each LTE carrier.

The measured power spectral density profile versus the time and frequency of each carrier and format can be stored in a database or appropriate memory 862. The power profile database can be used for applying traffic-load-monitoring functions. For example, a resource-allocation map over time and frequency can be derived from the measured power snapshots of narrowband signals. Narrowband signals having a power density higher than a given threshold can be designated as "active" because narrowband signals having a power density higher than a given threshold may be associated with a traffic load. Narrowband signals having a power density lower than a given threshold can be designated as being associated with noise and marked as "inactive". The threshold for determining whether narrowband signals are active or inactive can be the power density of the noise floor measured at non-loaded traffic conditions when no traffic is being transmitted through the DAS (e.g., at the commissioning of the system).

Alternatively, the resource utilization monitor (RUM) 860 can measure narrowband signals which are not transporting traffic load at a given point in time. The noise floor calibration can be applied to the signal formats processed by the RUM of each remote unit. The noise floor can be a reference for discriminating between "active" and "inactive" resources during a given time period. The start of the time period can be triggered when the first narrowband signal is detected as "active". The traffic activity can be measured as a percentage of resource usage versus the total available resources. In LTE and GSM, the frequency resources that are in use per remote unit can be determined over time and frequency. Using the specific frequency resources that are in use per remote unit over time and frequency can provide more precise measurement results than using a long-term power measurement because imperfections in power control for the user device may not affect the power measurement. Long-term power measurements may be available, for example, in UMTS embodiments.

For LTE, the number of active user devices per time slot can be estimated by measuring the number of active physical resource blocks over the total number of physical resource blocks determined to be "active". Assuming a non-adjacent frequency allocation for the users, different groups of active physical resource blocks allocated to a specific user can be identified. The number of user devices per time slot can be computed by dividing the total number of "active" physical resource blocks by the number of identified physical resource block groups.

In some examples, IQ samples of a given format can be grouped based on carrier format that is being processed. The per-format power profile can be calculated based on the grouped IQ samples. The power profile can be calculated, for example, by squaring each IQ sample and summing the results for the grouped IP samples. Resources for a given carrier can be assigned in the frequency and time domains. The RUM can output a power profile per sample time and in the time domain.

Power profile information can be stored, for example, in a database 862 in the RUM, as seen in FIG. 13. The power profile information can be used for a variety of purposes, and can be used to determine the location of a person in the coverage area, in accordance with the invention.

FIG. 14 illustrates graphically the power profiles over time and frequency for uplink signals associated with various users under LTE standards and GSM standards. The uplink signals for an LTE user, such as users 811-814, as illustrated in FIG. 14, are scheduled on specific Physical Resource Blocks (PRBs) used for the LTE protocol. Those PRBs are associated with specific frequency portions of the carriers, and specific time slots. The power profiles for the uplink signals for each of the users, User #1-User #4, are indicated along the Power axis. Alternatively, GSM users and the uplink signals associated therewith are scheduled on a specific burst and carrier, as indicated along the Frequency and Time axes in FIG. 14. The power associated with the uplink signals for each user, User #1-User #4, is also reflected along the power axis. The RUM component 860 measures the power profile for each of the active users in the various LTE and GSM carrier space for each remote antenna unit. The power and timing information associated with the measured power profile for the detected active resources and users is then provided by each RUM component 860 to the location measurement unit or LMU 866 in accordance with the invention.

In one embodiment, the present invention takes advantage of features of various wireless communication standards, including LTE and GSM standards for the purposes of utilizing power profile signal information in order to determine a user's position within an area covered by a distributed antenna system. More specifically, both LTE and GSM standards adopt uplink Timing Advance (TA) and uplink Transmit Power Control procedures in managing the resources that are allocated to particular users. The present invention also utilizes the fact that a user within a distributed antenna system may be communicating with a plurality of remote units of the system. Using such conditions and the features associated with such LTE and GSM systems, the signal information for various users, as determined by the invention, is used to determine the location of a user.

Figure 15:
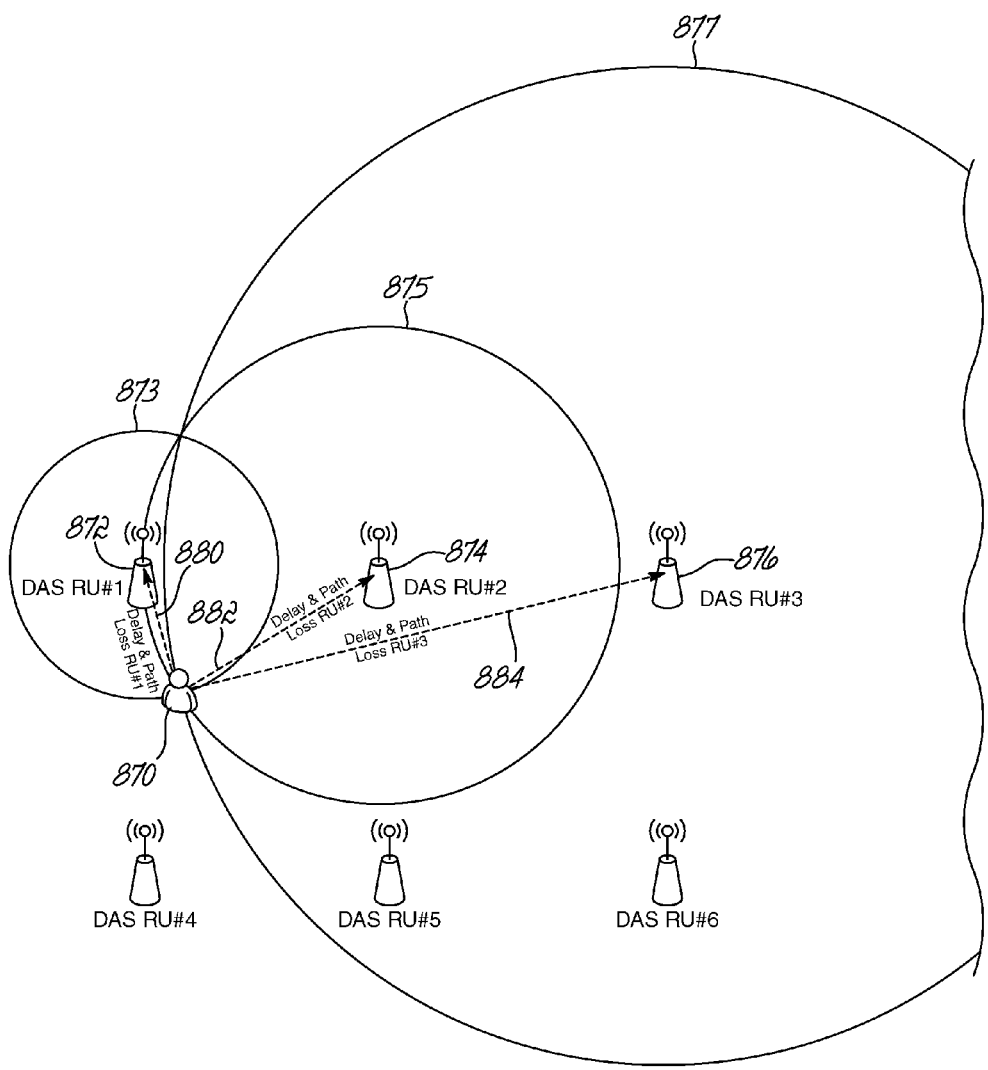
FIG. 15 is an illustrated diagram of a distributed antenna system for implementing the invention.

Referring to FIG. 15, a user is shown within the space covered by a distributed antenna system, wherein six exemplary remote units are indicated as RU #1-RU #6. The user 870, based upon proximity to the various different remote units, may be in signal contact with a plurality of remote units 872, 874, and 876 (e.g., RU #1-RU #3). The invention takes advantage of the communication with multiple remotes in the LTE and GSM systems. Those various remote units will have specific effective coverage areas indicated in FIG. 15 as 873, 875, and 877, respectively for their interactions with user 870. Since those coverage areas overlap, user 870 and their mobile device may be interfacing, through uplink signals 880, 882, 884, with each of the three remote units 872, 874, and 876. As such, the user 870 may be allocated specific resources by one or more BTS's through each of those remote units. Therefore, according to the communication standards associated with both LTE and GSM protocols, resources will be managed for each of those remote units and user 870 according to the standards of a particular carrier signal that is utilized by the user through the distributed antenna system. The invention uses the resource information and power profile signal information for a user from various of the remotes in order to determine user location.

Figure 16:
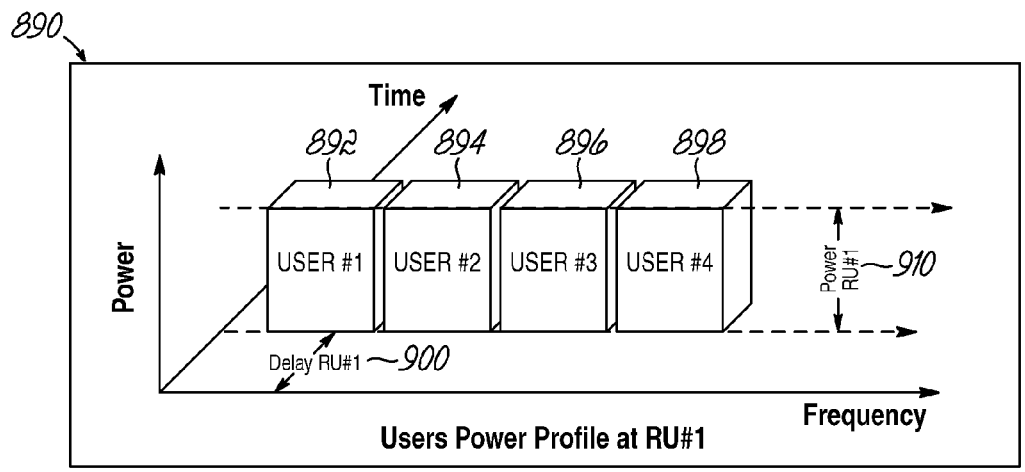
FIG. 16 is an illustrated embodiment of the power profiles utilizing in accordance with one aspect of the invention.
Figure 16:
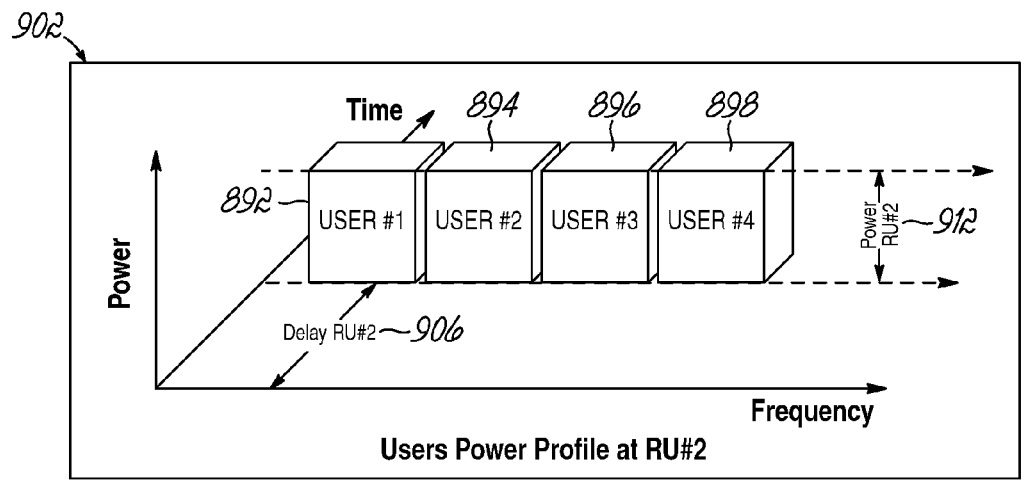
Figure 16:
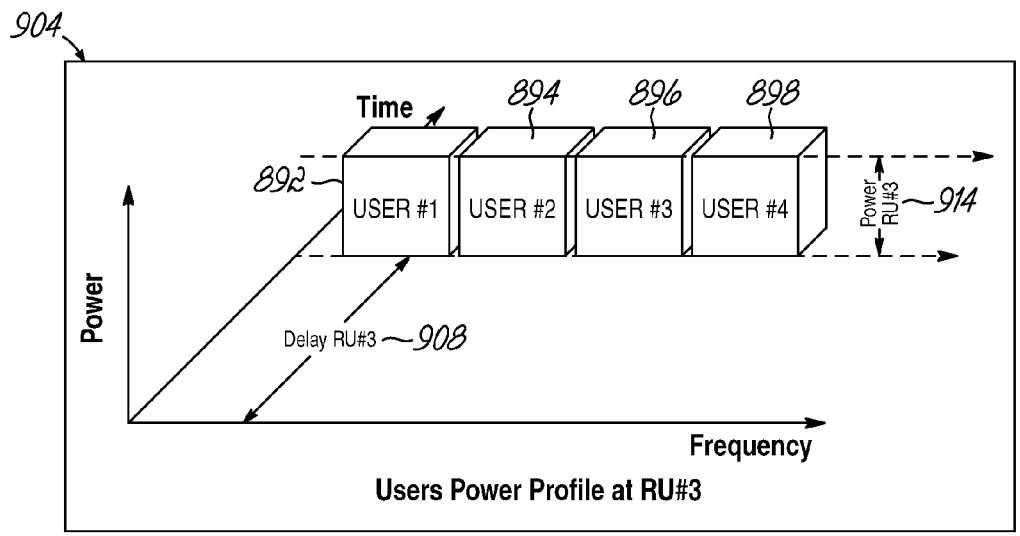

The different measured power profiles associated with the user with a distributed antenna system are graphically illustrated in FIG. 16 based upon the different paths that uplink signals from a user's mobile device will take to reach one of the remote units. Specifically, path 880 is illustrated as the shortest path, because the user is closest to remote unit 872. Path 882 to remote unit 874 is then the next longest path, with path 884 to remote unit 876 being the longest. As illustrated, there will be a time delay associated with the user receiving the signal in each of the paths 880, 882, 884 because of the different distances. There will also be power differences due to the path losses associated with each of those different paths. The present invention, utilizing the RUM component 860 associated with each of the remote units, as well as the location measurement unit 866 uses the differences that are reflected in the measured power profiles of the user 870 for each of the affected remote units 872, 874, and 876 to determine the user location. One power profile from a remote is used as and designated as a reference power profile. The signal information that is associated with the reference power profile is used as a baseline value. The location measurement unit evaluates additional power profiles and uses the signal information associated with those other power profiles to provide other values that are different relative to the baseline value for the purposes of determining difference values. Their difference is reflective of the location of the user device with respect to the plurality of different remote units and the different signal paths. The difference values are used to determine the location of the specific users and their devices. More specifically, the invention takes advantage of conditions associated with the uplink timing advance procedure and the uplink transmit power control procedure associated with the LTE and GSM standards to evaluate differences in the signals associated with various power profiles, including differences in the time delay or phase associated with the signals from the different remotes, as well as the differences in power levels. The information is processed by the location measurement unit 866 to determine user location.

Specifically, various communication standards, including LTE and GSM, use uplink timing advance (TA) procedures. The present invention uses signal information for a particular user mobile device and their interaction with multiple remote units and takes advantage of signal conditions associated with the uplink timing advance procedures. Such timing advance procedures are utilized to keep the signal resources allocated to the multiple users essentially orthogonal or non-interfering in the time domain, when the various user uplink signals arrive at the BTS receiver. Within the distributed antenna system of the invention, such uplink signals would be those signals that pass through the one or more remote units that are seen by the mobile devices of the user, and thus, that are used by the user for communication purposes. The timing of the uplink signal transmissions associated with each user through a specific remote unit is triggered utilizing a specific Timing Advance (TA). The Timing Advance (TA) is dependent upon the path between the user and the BTS. Within a distributed antenna system, this path, as illustrated in FIG. 15, is dependent upon the distance between the user and a particular remote unit of the distributed antenna system. Therefore, a specific timing advance, which depends upon the path delay that is estimated between the user and the BTS, would actually reflect the path delay that is estimated between the user and a particular remote unit. The BTS estimates the delay based on the shortest path from the user to the BTS. I the distributed antenna system of the invention, the system takes into account that it is likely that the noted shortest path from the user to the BTS will be the path that goes through the remote unit that is actually closest to the user in a particular space, such as a building. As shown in FIG. 15, that shortest path might be path 880 from a user 870 to remote unit 872 (RU #1). The delay information and other signal information associated with that shortest path is utilized as a reference time for the inventive process. The reference time or base time is then compared to times associated with other paths associated with the user 870

In one aspect of the present invention, the invention uses the signal information that is associated with a particular user and the various signal paths to the multiple different remote units 872, 874, and 876. The signal information for the various noted paths 880, 882, and 884 is then used to develop a time difference or time delta that is associated with the active resources of the remote units associated with the user. The location measurement unit 866 uses the timing information for location determination. More specifically, time instant or time stamp information is determined upon the detection of active resources at the closest remote unit (e.g., remote unit 872). That time stamp information/data or timing data is utilized as a reference value, or reference timing data for the particular user. As noted, because of the wireless standards that utilize timing advance, part of the measured power profile (FIG. 16) associated with the each of the various remote units will include signal information and timing information that is associated with a single user and their interaction with that particular remote unit.

Referring to FIG. 16, user power profiles are illustrated for a plurality of users, including User numbers #1-#4 (892-898), as illustrated. The user power profiles are provided by the resources utilization monitor 860 for the various users and for the different remote units that are close to those users. For a set of users, signal information will be established for the uplink signals of each user relative to a particular remote unit, such as the closest remote unit 872, as illustrated by graph 890 of FIG. 16. Each of the users 892, 894, 896, and 898 will have delay information related to their particular power profile, and the delay information is associated with the time delay reflective of the path, such as path 880, that exists between the user device and the first remote unit 872. The delay 900 is illustrated in graph 890, as a delay along the time axis for the illustrated power profiles. This generally assumes that all of the noted users are closest to the remote unit 872 so the delay is shortest with respect to remote unit 872. As such, the power profiles associated with the closest remote unit and the signal information associated therewith are used as reference profiles and reference signal information.

Graphs 902 and 904 are also illustrated in FIG. 16, and show the power profiles for those same users 892-898, wherein the power profiles are associated with interactions with a different remote unit, such as second remote unit 874 (see FIG. 15). Because that remote unit 874 is not as close as remote unit 872 and because of the resulting longer signal path length 882 to that remote unit 874, the delay 906 and signal timing information/data associated therewith will be different. The difference is reflective of the different time of the detection at a BTS for the same users for signals coming through that second remote unit 874 versus the first remote unit 872. The delay will generally be longer as illustrated due to the longer signal path. As further noted herein, the increase in delay coincides with a decrease in the power level for the various power profiles. Similar to graph 902 and as illustrated in graph 904 of FIG. 16, the farthest remote unit 876 is associated with an even longer path 884 and this is reflected in power profiles having a further increased delay 908. The signals that pass through remote unit 876 from all of the user devices will also have different associated signal information and/or timing information/data based on that increased delay.

The invention uses the different information associated with the different delays relative to the reference information for the shortest delay for determining the location of one or more users and their devices. Specifically, the location measurement unit 866 determines timing difference values or timing deltas for the various users using the signal information associated with the closest remote unit and all the other farther remote units. That timing data and timing difference values and information are utilized along with power differentials, as discussed herein, for determining the position of the user within the distributed antenna system and, more specifically, the position of the user in the space covered by that distributed antenna system, such as a building.

As noted herein, certain communication standards, including LTE and GSM standards, also utilize uplink transmit power control procedures in order to keep the resources allocated to a plurality of users at similar receive power levels when arriving at a BTS receiver. That is, the transmit power control ensures that the power of the uplink signals from the different users arrives at the BTS, in the same power range. Therefore, according to such a transmit power control procedure, the uplink signal transmissions from each user is triggered at a power level that will depend upon the path loss that is estimated for the path between the user and a particular BTS. For a particular user, the BTS will estimate the path loss based on the lowest signal path loss from that user to the BTS. For a distributed antenna system, it is likely that the lowest signal path loss will be associated with the signal path that goes through the particular remote unit that is closest to a user, such as path 880 illustrated in FIG. 15. In accordance with one aspect of the invention, power information regarding the power level that is set at the detection of users and active resources at the closest remote unit 872 will be utilized as a reference value for determining power differentials for each of the other remote units.

Again turning to FIG. 16, the illustrated power profiles 890, 902, 904, reflect power levels and power level data along the power axis. For the closest remote unit 872 (RU #1), the graph 890 illustrates relatively a power level value 910 associated with the determined power level data associated with the first or closest remote unit. For each of the other farther remote units 874 (RU #2), 876 (RU #3), the power is reflected by power level values 912, 914 for the various users, as illustrated in graphs 902, 904 in FIG. 16. As may be appreciated, the power values 912 and 914, in relation to value 910, illustrate power level difference values or power differentials with respect to that reference power value 910 associated with the closest remote unit. In accordance with one aspect of the invention, the power level difference values or power differentials are implemented for estimating a user's position within an area of a distributed antenna system.

Referring to FIG. 13, the location measurement unit 866 receives power profile data and information for the various carriers and for the associated narrowband signals for the detected active resources for each of the detected users from the RUM 860. The location measurement unit includes processing circuitry, such as a processor, configured for using the specific time reference and time delta information from the measured power profiles, as well as the measured power reference and power difference information to determine and estimate a user's position within the area covered by the distributed antenna system.

For example, having signals and power profiles associated with at least three remote units, the location measurement unit may receive the signal information and data for a plurality of different power profiles from different remote units wherein all the power profiles are associated with a specific user. The location measurement unit then processes the signal information/data, and may use trilateration techniques and/or triangulation techniques with the signal information/data for estimating a user's position. The signal strength or power measurements and the time delay measurements and difference data can be used singularly, or in combination, for estimating the user distances to the various remote units for position estimation. The signal strength/power measurements and the noted timing differences between each of the specific remote units are proportional to the distance of the user and their mobile device from each of the multiple specific remote units.

In one embodiment of the invention, for improved accuracy, a line-of-site channel condition might happen between the specific user and each of the remote units. Therefore, the signal strength information, as determined from the measured user power profile data (FIG. 16), as well as the differences in the measured power levels between the reference power value 910 and power values 912 and 914 from other remote units, are utilized by the location measurement unit 866 to determine a respective distance of user and their mobile device from a particular remote unit. With that distance, and information associated with at least three remote units for the same user, the location measurement unit does the necessary triangulation/trilateration processing to provide a position indication for a device inside the coverage area for determining the location of the user.

As noted, the time that is needed for the signal to travel from the user to a particular remote unit is also proportional to the distance from a user device to the remote unit, as indicated by the signal delay information 900, 906, 908 associated with the various power profiles for multiple remote units, as illustrated in FIG. 16. The DAS system of the invention provides a synchronous reception of the user signals at the plurality of remote units. With that synchronous signal reception, the phase of the complex narrowband signals can be used to measure the timing difference values or time differential, across the different remote units. That is, utilizing the signal information for user signals associated with the closest remote unit, as illustrated in graph 890 of FIG. 16 and the noted delay 900, that phase of the complex narrowband signals reflected by the reference delay information 900 is compared against the phase differences or delays 906, 908 associate with the narrowband I/Q signals from the other different remote units, as illustrated in graphs 902 and 904 of FIG. 16. The location measurement unit calculates the distance associated with the phase differences, and uses the calculated distances with well-known triangulation/trilateration techniques to provide a location for a specific user.

In one embodiment of the invention, the power information and power level difference values or power differentials associated with each of the measured profiles for a user may be utilized to determine proportional distances, and thus, calculate position. In an alternative embodiment, just the time delay or phase differential for user signals between multiple remote units might be implemented for determining distance. In still a further embodiment of the invention, both power and power differential information is utilized in combination with time delay and time differential information for user signals associated with multiple remotes that are utilized to calculate and provide the location of a user utilizing the location measurement unit 866.

The location information might be utilized for emergency services, such as E911 services. Alternatively, applications running on a mobile device, such as a smart phone, may require location for the purposes of navigation, advertisements, information, and other uses, and thus, may be provided utilizing the invention for such purposes even though the user and their mobile device is shielded from GPS signals within a building or other structure. Furthermore, the location information can be provided to a BTS coupled with a distributed antenna system so that the knowledge of a user position at the remote unit level may be implemented for optimal reallocation of the resources of a network. That is, using the benefits of the present invention, the system can selected which time and frequency resources should be transported to/from which remote units, according to a specific position of a user within the overall network of remote units and the specific network resources.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A distributed antenna system comprising:
   a master unit configured for interfacing with at least one signal source;
   a plurality of remote units coupled with the master unit and configured for interfacing with a user device, a remote unit including:
      filtering circuitry for decomposing uplink signals from the user device into a plurality of narrowband signals;
      processing circuitry for evaluating the plurality of uplink narrowband signals and providing data for a power profile that is associated with the uplink signals of a specific user device;
   location measurement circuitry coupled with the remote units and configured to receive data for a plurality of different power profiles from a plurality of different remote units wherein the plurality of power profiles are associated with the same specific user device, the location measurement unit configured for processing the power profile data from the different remote units to determine the location of the specific user device in an area of the distributed antenna system.

2. The distributed antenna system of claim 1 wherein the filtering circuitry is configured for decomposing a carrier signal into a plurality of narrowband signals reflective of equal divisions of the bandwidth of the carrier signal.

3. The distributed antenna system of claim 1 wherein the filtering circuitry is digital circuitry configured for providing I/Q digital representations of the narrowband signals.

4. The distributed antenna system of claim 1 wherein the filtering circuitry includes a filterbank configured for processing an uplink carrier signal into a plurality of narrowband signals, the filterbank including a plurality of demodulators for providing a plurality of frequency-shifted narrowband signals and a plurality of filters coupled with respective demodulators for defining the bandwidth of the narrowband signals.

5. The distributed antenna system of claim 1 wherein the power profile from one of the plurality of different remote units is a reference power profile, the location measurement circuitry evaluating additional power profiles against the reference power profile to determine difference values and further configured for using the difference values to determine the location of the specific user device in the area of the distributed antenna system.

6. The distributed antenna system of claim 5 wherein the processing circuitry is configured for providing data for the power profile including signal timing data, the location measurement circuitry evaluating reference timing data against timing data for additional power profiles to determine timing difference values and further configured for using the timing difference values to determine the location of the specific user device in the area of the distributed antenna system.

7. The distributed antenna system of claim 5 wherein the processing circuitry is configured for providing data for the power profile for the specific user device including power level data, the location measurement circuitry evaluating reference power level data against power level data for additional power profiles to determine power level difference values and further configured for using the power level difference values to determine the location of the specific user device in the area of the distributed antenna system.

8. The distributed antenna system of claim 5 wherein the processing circuitry is configured for providing data for the power profile including both timing data and power level data, the location measurement circuitry evaluating reference timing data against timing data for additional power profiles to determine timing difference values and evaluating reference power level data against power level data for additional power profiles to determine power level difference values, the location measurement circuitry further configured for using both the timing difference values and the power level difference values to determine the location of the specific user device in the area of the distributed antenna system.

9. The distributed antenna system of claim 1 wherein the power profile associated with the uplink signals of the specific user device is reflective of the distance of that specific user device from the remote unit providing the power profile.

10. The distributed antenna system of claim 1 wherein the uplink signals from the user device are signals according to at least one of LTE standards and GSM standards, the processing circuitry configured for providing data for the power profile that includes timing information based upon the at least one standard.

11. The distributed antenna system of claim 1 wherein the uplink signals from the user device are signals according to at least one of LTE standards and GSM standards, the processing circuitry configured for providing data for the power profile that includes power information based upon the at least one standard.

12. The distributed antenna system of claim 1 wherein the location measurement circuitry is configured for processing power profile data and using at least one of trilateration or triangulation for determining the location of the specific user device in the area of the distributed antenna system.

13. A method of determining the location of a user device within a space comprising:
   with a plurality of remote units positioned around the space, interfacing with at least one user device;

decomposing uplink signals from the user device into a plurality of narrowband signals;

evaluating the plurality of uplink narrowband signals and providing data for a power profile that is associated with the uplink signals of a specific user device;

collecting data for a plurality of different power profiles from a plurality of different remote units wherein the plurality of power profiles are associated with the same specific user device;

processing the power profile data from the different remote units to determine the location of the specific user device in the space.

14. The method of claim 13 wherein further comprising providing I/Q digital representations of the narrowband signals.

15. The method of claim 13 further comprising evaluating the power profile from one of the plurality of different remote units as a reference power profile and evaluating additional power profiles against the reference power profile to determine difference values, and using the difference values to determine the location of the specific user device in the space.

16. The method of claim 15 further comprising providing data for the power profile that includes signal timing data, evaluating reference timing data against timing data for additional power profiles to determine timing difference values and using the timing difference values to determine the location of the specific user device in the space.

17. The method of claim 15 further comprising providing data for the power profile that includes power level data, evaluating reference power level data against power level data for additional power profiles to determine power level difference values and using the power level difference values to determine the location of the specific user device in the space.

18. The method of claim 15 further comprising evaluating the power profile including both timing data and power level data and evaluating reference timing data against timing data for additional power profiles to determine timing difference values and evaluating reference power level data against power level data for additional power profiles to determine power level difference values, and using both the timing difference values and the power level difference values to determine the location of the specific user device in the space.

19. The method of claim 13 wherein the uplink signals from the user device are signals according to at least one of LTE standards and GSM standards and further comprising providing data for the power profile that includes timing information based on the at least one standard.

20. The method of claim 13 wherein the uplink signals from the user device are signals according to at least one of LTE standards and GSM standards and further comprising providing data for the power profile that includes power information based on the at least one standard.

* * * * *